US012570059B2

(12) United States Patent
Korkama

(10) Patent No.: US 12,570,059 B2
(45) Date of Patent: Mar. 10, 2026

(54) TIRE AND A MOULD FOR MANUFACTURING A TIRE

(71) Applicant: NOKIAN RENKAAT OYJ, Nokia (FI)

(72) Inventor: Tomi Korkama, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 4 days.

(21) Appl. No.: 18/593,649

(22) Filed: Mar. 1, 2024

(65) Prior Publication Data

US 2024/0294039 A1 Sep. 5, 2024

(30) Foreign Application Priority Data

Mar. 2, 2023 (EP) ..................................... 23159574

(51) Int. Cl.
*B29D 30/06* (2006.01)
*B60C 11/12* (2006.01)
(52) U.S. Cl.
CPC .. *B29D 30/0606* (2013.01); *B29D 2030/0613* (2013.01); *B60C 11/12* (2013.01)
(58) Field of Classification Search
CPC . B60C 11/12; B60C 11/1204; B60C 11/1218; B60C 11/1222; B60C 11/1259; B60C 11/1272; B60C 2011/1268; B60C 2011/1286; B29D 30/0606; B29D 2030/0607; B29D 2030/0613
USPC ..... 152/209.1, 209.18, 209.25; 425/28.1, 32, 425/34.1, 46
See application file for complete search history.

(56) References Cited

U.S. PATENT DOCUMENTS

| | | | |
|---|---|---|---|
| 5,327,953 A | 7/1994 | Ichiki | |
| 7,628,598 B2 | 12/2009 | Hana | |
| 2024/0034013 A1* | 2/2024 | Hoppe | B29D 30/0606 |
| 2024/0066822 A1* | 2/2024 | Ishihara | B60C 11/1281 |

FOREIGN PATENT DOCUMENTS

| | | | |
|---|---|---|---|
| CN | 112659417 A | 4/2021 | |
| EP | 2821212 A2 | 1/2015 | |
| JP | 4052386 B2 * | 2/2008 | |
| JP | 2009255734 A | 11/2009 | |

(Continued)

OTHER PUBLICATIONS

Mitsuo Kurebayashi, JP-4052386-B2, machine translation. (Year: 2008).*

(Continued)

*Primary Examiner* — Sedef E Paquette
(74) *Attorney, Agent, or Firm* — Merchant & Gould P.C.

(57) ABSTRACT

A mould for manufacturing a tire includes a plurality of segments including a first segment. The first segment has a first end, an opposite second end, primary lamella blades that are arranged close to the first end, and secondary lamella blades that are arranged far from both the ends. An average of the heights of the primary lamella blades is at least 75% of an average of the heights of the secondary lamella blades. A bending strength of the primary lamella blades against bending in a circumferential direction of the mould is greater than a bending strength of the secondary lamella blades against bending in the circumferential direction of the mould. A tire is manufactured by the mould.

15 Claims, 10 Drawing Sheets

(56)  References Cited

FOREIGN PATENT DOCUMENTS

| JP | 2019130690 | A |   | 8/2019 |
|----|------------|---|---|--------|
| JP | 2022022692 | A | * | 2/2022 |

OTHER PUBLICATIONS

Sugiyama Daichi, JP-2022022692-A, machine translation. (Year: 2022).*

Extended European Search Report received for EP Application No. 23159574.5 on Jul. 18, 2023, 11 pgs.

* cited by examiner 511, 521, 541, 545

550, 551

L h₁ t₁

SR

C 511, 521, 541, 545

550, 551

L

C

CL t₁

512, 531

L h₂ t₂

SR

C 512, 531

L

C

CL t₂

550, 551

C

L

CL 511, 521, 541, 545 t₁

511, 521,
541, 545

L $t_1$ $h_1$

SR

C 511, 521,
541, 545

L

C $t_1$

611

511, 521,
541, 545

553

621

C

SR $h_3$

552

$h_1$

551

511, 521,
541, 545

L

SR

C

554

511, 521,
541, 545

L

C

554

α dir2     dir1

512,
531

L

SR

C 512,
531

L

C 521   522   511

IXb

211

231

C 531
532

512

IXc

235

521

$d_1$

522

531

$d_2$

532

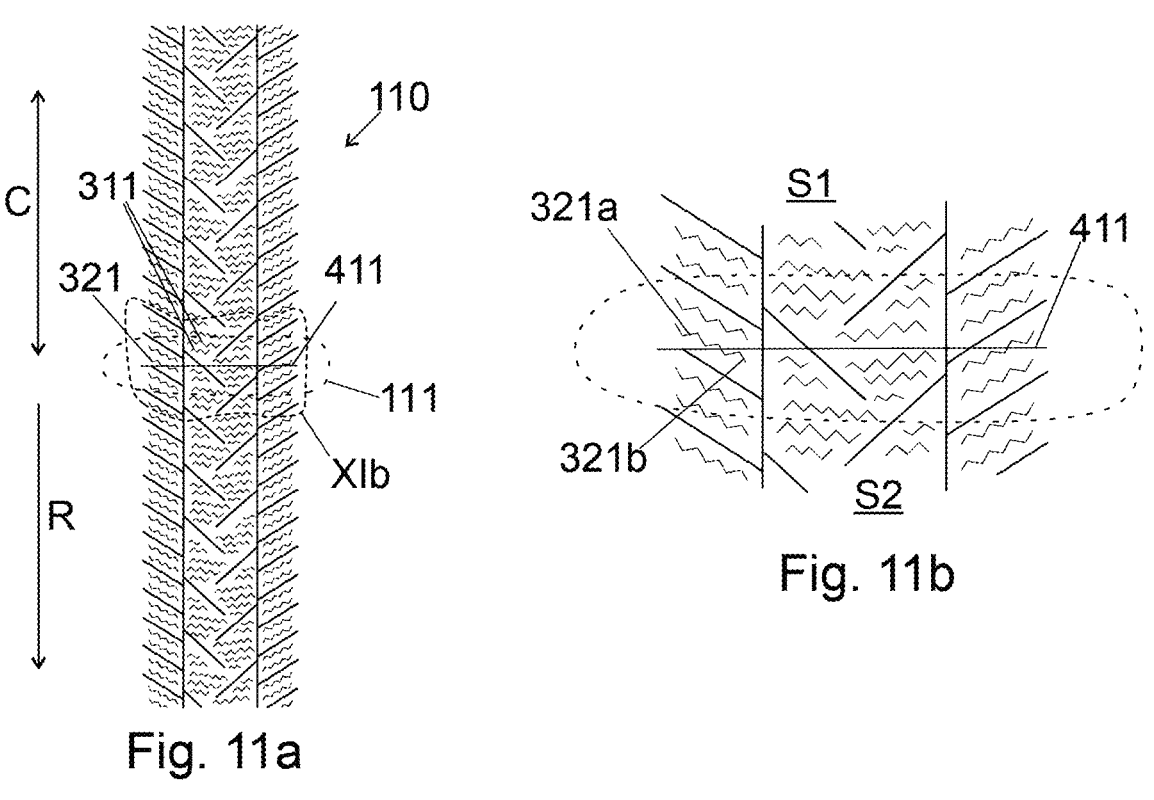
Fig. 11a
Fig. 11b
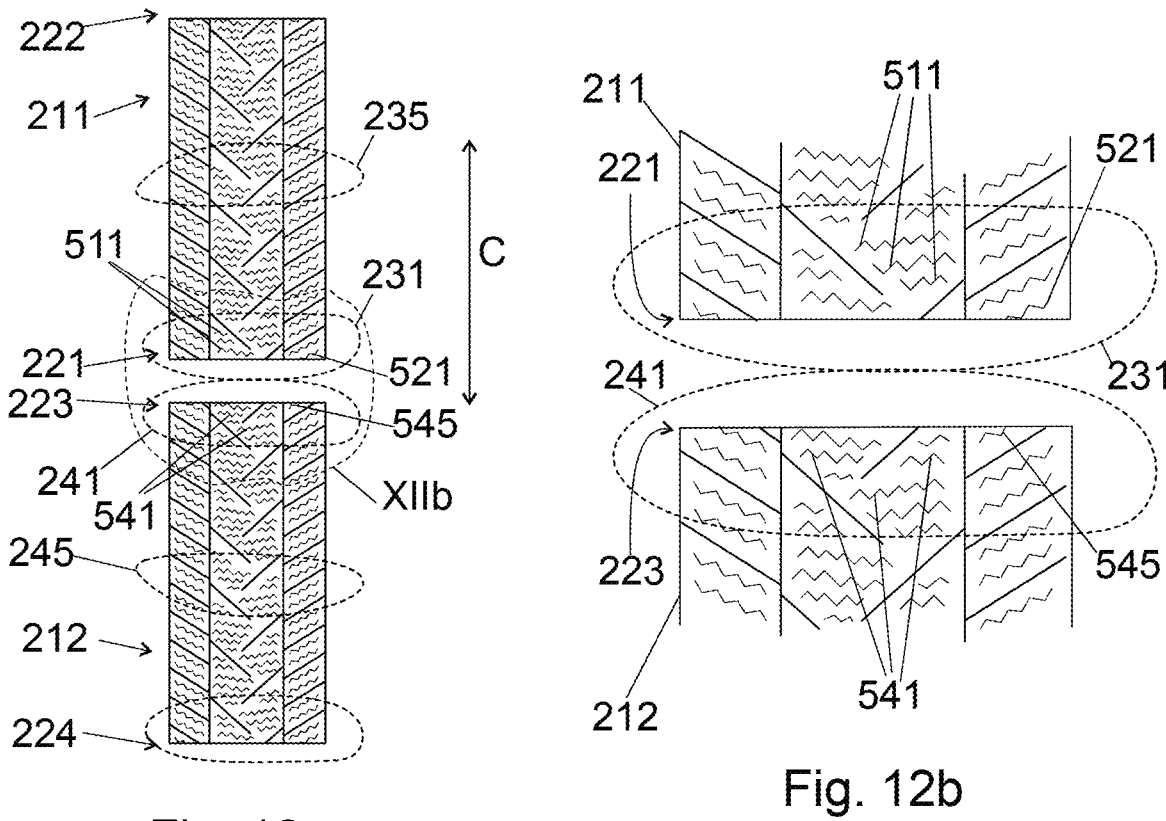
Fig. 12a
Fig. 12b

TIRE AND A MOULD FOR MANUFACTURING A TIRE

CROSS-REFERENCE TO RELATED APPLICATION

The present application claims priority to European Patent Application No. 23159574.5 filed on Mar. 2, 2023, which application is incorporated herein by reference in its entirety.

TECHNICAL FIELD

The invention relates to tires, in particular pneumatic tires for vehicles. The invention relates to passenger car tires, in particular passenger car winter tires. Such tires are commonly manufactured in a mould. The invention relates to a mould for manufacturing such a tire.

BACKGROUND

A tyre is oftentimes manufactured by vulcanizing (i.e. curing) a green tire in a mould. To open and close the mould it comprises several segments movable in a radial direction. When opening the mould by moving the segment in a radial outward direction, lamella blades of the mould are exposed to high shear stress. This may cause breaking of the mould near the ends of the segment.

In the prior art, solutions to this problem include designing the lamella blades near the segment end such that those lamella blades have smaller contact area with the tread rubber and/or by using more flexible material for the lamella plates, as disclosed in the document EP2821212. Means for reducing the contact area include shortening the lamella blades and/or reducing embossing. The shortening of the lamella blades in the context of EP2821212 implies that the lamella blades at the segment ends protrude a shorter distance from the mould surface than the other lamella blades. As a result, the sipes of the tire, formed by the lamella blades, are shallower near the segment seams than elsewhere (see, in particular FIG. 3 of EP2821212).

SUMMARY

The inventors have found that having both shallow sipes and deeper sipes in the same tire, as in the prior art, poses several problems including handling of a new and a worn tire, uneven wear, reduced grip and stability, increased noise, increased vibration and increased harshness. Namely, the effective hardness of the tire material is not constant, because the shallower sipes near the segment seams imply effectively harder material. Moreover, when the tire wears, the situation becomes even worse, because the shallow sipes may completely wear off. Both these aspects give rise to the problems indicated above.

In accordance with this finding, the inventors have investigated for possibilities of improving these properties of the tire by using equally deep sipes in the tire, both near segment seams and elsewhere. The inventors have found that by increasing a bending strength of the lamella blades of the segments of the mould near the segment ends, the depth of the sipes of the tire can be kept equal also near the segment seams.

BRIEF DESCRIPTION OF THE DRAWINGS

FIG. 11*a* shows in a radial inward projection a tread of a tire producible by a mould, the tread comprising a sipe that extends on two opposite sides of a segment seam, FIG. 11*b* shows the detail XIb of FIG. 11*a*, FIG. 12*a* shows in a radial outward projection a first segment of a mould and a second segment of the mould, the mould being for producing a tire having a tread comprising the part shown in FIG. 11*a* and the mould being in an open position, FIG. 12*b* shows the detail XIIb of FIG. 12*a*.

DETAILED DESCRIPTION

FIGS. 1*a* to 1*d* show general principles of last steps for manufacturing a tire. A green (i.e. uncured) tire is made as known in the art, e.g. from EP3243644. To cure the green tire 105 to form a vulcanized tire, the green tire 105 is arranged in a mould 200 and heated to vulcanize the green tire 105 to form the tire 100. The mould 200 is annular, as is the green tire 105 and the tire 100, and typically comprises segments 211, 212, 213, 214, 215, 216, 217, and 218. Naturally, the mould 200 may comprise a greater number or a smaller number of segments than eight, such as 6 to 14 segments.

Figures 1A, 1B, 1C, 1D, 2A, 2B:
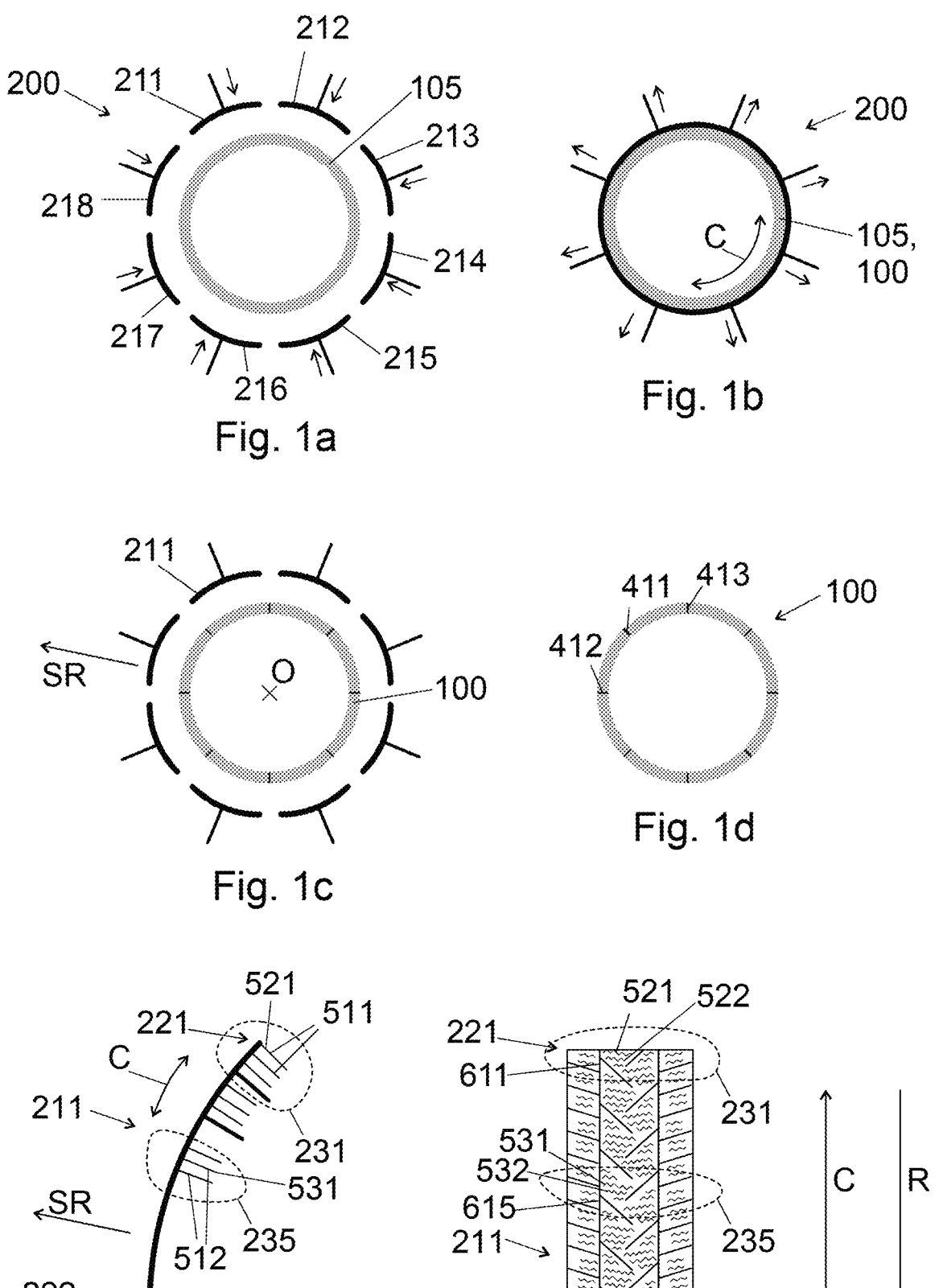
FIG. 1*a* shows in a side view a green tire and a mould in open position.
FIG. 1*b* shows in a side view a green tire being vulcanized and the mould in closed position.
FIG. 1*c* shows in a side view a vulcanized tire and the mould in open position.
FIG. 1*d* shows in a side view a vulcanized tire.
FIG. 2*a* shows in a side view a segment of the mould, i.e. a mould segment.
FIG. 2*b* shows in a radial outward projection the segment of the mould.

The segments 211, 212, . . . , 218 are movably radially outwards (in the +SR direction) to open the mould so that the green tire 105 can be inserted into the mould 200 as shown in FIG. 1*a*, and the vulcanized tire 100 can be removed from the mould 200, as shown in FIG. 1*c*. In FIGS. 1*a* and 1*c*, the mould 200 is in an open position.

As shown in FIG. 1*b*, when the green tire 105 is being vulcanized to form the vulcanized tire 100, the segments have been moved radially inwards (in the direction −SR) to close the mould and to form the annular mould 200. In FIG. 1*b*, the mould 200 is in an closed position.

Such a manufacturing process produces segment seams 411, 412, 413 to the vulcanized tire 100. The segment seams are located at the points, where two segments, such as 211 and 212, contact each other when the mould 200 is in the closed position.

Figure 3A:
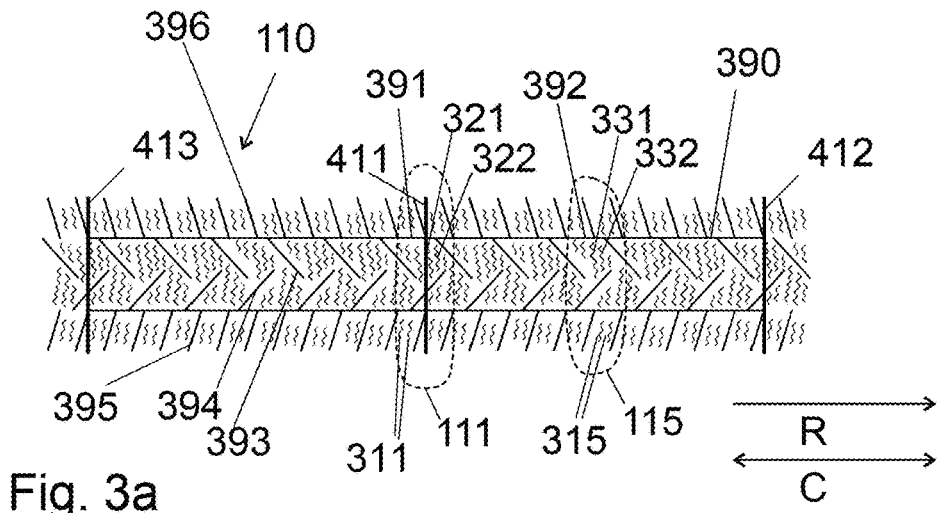
FIG. 3*a* shows in a radial inward projection a tread of a tire producible by the mould, the mould comprising the segment of FIG. 2*b*.

The mould 200 often comprises ridges configured to form grooves of the tire. The mould often comprises lamella blades configured to form sipes of the tire. The sipes, as well as the lamella blades, are typically transversal and the lamella blades protrude radially inwards from surfaces of the mould segments. Sipes are provided to the tire to effectively soften the tire material and to improve grip particularly of winter tires. Thus, the shapes of the lamella blades of the mould define the shapes of the sipes of the tire. Likewise, the shapes of the ridges of the mould defined the shapes of the grooves of the tire. The sipes and the grooves are arranged on a tread of a tire, as well known. Moreover, in certain types of tires, the transversal grooves (393, 394, 395, 396; FIG. 3*a*) define a direction of rotation R for the tire. The direction of rotation R is the direction of rotation R of the tire, when the vehicle onto which the tire is mounted travels forward. In an embodiment, the transversal grooves (393, 394, 395, 396) define a V-shape that opens reverse to the direction of rotation (see FIGS. 3*a* and 3*b*). In an embodiment, the transversal grooves define only a half of a V-shape that opens reverse to the direction of rotation (see FIGS. 4*a* and 4*b*). In an embodiment, the tread 110 of tire 100 has such a shape that the tread defines a direction of rotation R. In such an embodiment, the tire 100 preferably further comprises a marking on a sidewall of the tire, the marking being indicative of a direction of rotation of the tire. However, the embodiments are usable in other tires, too, which may be e.g. asymmetric tires not having a defined direction of rotation.

As indicated in FIG. 1*b*, when the green tire is being cured, the segments are in arranged in the closed position (i.e. a radially inward position). However, after vulcanizing the tire, the segments are moved radially outwards to the open position, as readable from FIGS. 1*b* and 1*c*. Thus, the transversal lamella blades near the ends of the mould segments are exposed to reasonably high bending forces caused by the vulcanized tire material in the vicinity of the lamella blades.

Figure 2C:
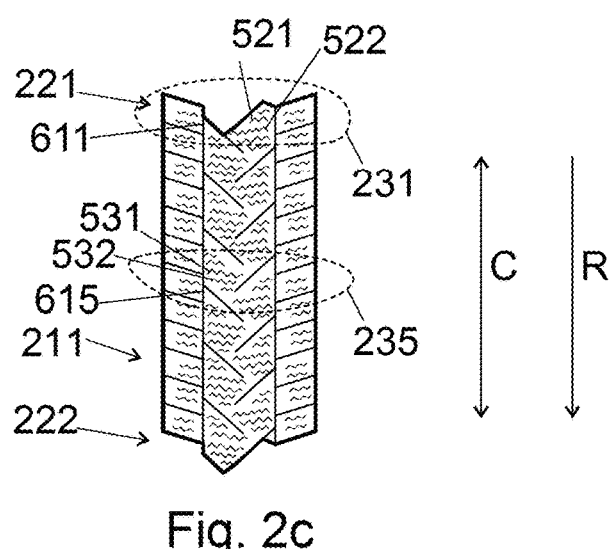
FIG. 2*c* shows in a radial outward projection a segment of a mould, the segment comprising a non-straight end.

To elaborate the embodiments of the present invention, a first segment 211 of the mould 200 is schematically shown in FIGS. 2*a* and 2*b*. FIG. 2*a* shows a side view of the first segment 211; and FIG. 2*b* shows an outward radial projection of the first segment 211; i.e. the first segment 211 as viewed from a centre O (see FIG. 1*c*) of the mould 200 in the radially outward direction +SR (see FIG. 1*c*). FIG. 2*c* shows an outward radial projection of another first segment 211; i.e. the other first segment 211 as viewed from a centre O (see FIG. 1*c*) of the mould 200 in the radially outward direction +SR (see FIG. 1*c*). As shown in FIG. 2*b*, the ends 221, 222 of the first segment 211 may be straight. As shown in FIG. 2*c*, an the ends 221, 222 of the first segment 211 need not be straight. The ends 211, 222 of the first segment may e.g. mainly follow the ridges for forming grooves as in FIG. 2*c*. The ends 211, 222 of the first segment may e.g. only follow the ridges for forming grooves, in which case segments seams shown in FIG. 4*b* would be obtained.

To improve properties of the tire 100, including the handling properties of the tire 100, particularly a worn tire, the sipes of the tire 100 are as deep near the segment seams 411, 412, 413 as further away from them. This shows in the mould segment 211 such that a height of primary lamella blades 511 arranged near the segments ends 221, 222 substantially equals a height of secondary lamella blades 512 arranged far away the segments ends 221, 222. When the sipes of the tire 100 are as deep near the segment seams 411, 412, 413 as further away from them the tire, in use, wears in the same manner near the segments seams and away from the segments seams. In particular, the wearing of the tire, which effectively makes the sipes less deep, affects the local properties of the tread in the same manner near the segments seam as further away from the segment seam. Thus, the handling of the worn tire improves, compared to a tire of prior art that has worn the same amount. This also reduces the vibrations of the tire in use as well as reduces noise generated by the tire. While the noise is reduced in general, also certain frequencies thereof is reduced, whereby the harshness of the tire is also reduced. This also affects grip of the tire, as a depth of the sipes needs not be reduced near segment seams, as well as stability, in particular when driving on a curved road.

However, as detailed above, in such a case high bending stress is imposed to the primary lamella blades 511. In order to withstand the high bending stress, a bending strength of the primary lamella blade 511 is greater than a bending stiffness of the secondary lamella blade 512. Herein bending strength refers to strength against bending in the circumferential direction C of the mould 200.

Figure 5A:
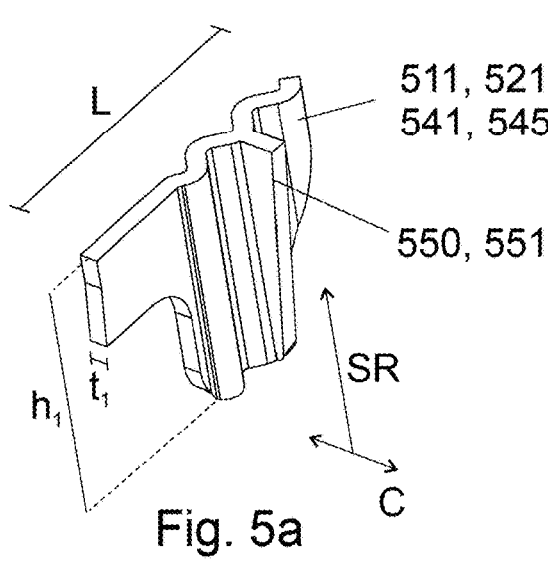
FIG. 5*a* shows a lamella blade of a segment of a mould in a perspective view, the lamella blade having a stiffening member in the form of a stiffening ridge.

The bending strength of the primary lamella blade 511 may be increased e.g. by using a stiffening member 550. In contrast, a secondary lamella blade 512 may be free from such a stiffening member, but otherwise identical, as shown in FIGS. 5a and 5c. The bending strength can be increased in other ways, too (i.e. in the alternative or in addition), as will be detailed below.

In view of what has been said above, an embodiment of a mould 200 for manufacturing a tire 100 comprises a plurality of segments (211, 212, 213, 214, 215, 216, 217, 218) including a first segment 211. The plurality of segments are configured to be in a first position (i.e. the closed position) and a second position (i.e. the open position). In the first position, the segments are arranged next to each other to form an annular mould for a green tire 105. In the second position, the segments are arranged apart from each other to remove the tire 100 from the mould 200.

The first segment 211 comprises a first end 221 and an opposite second end 222, as shown in FIGS. 2a to 2c. The first end 221 is arranged opposite the second end 222 in a circumferential direction C. The first segment 211 comprises a primary region 231, the whole primary region 231 being arranged at most 20 mm apart from the first end 221. This defines how "close" the primary lamella blade 511, as discussed above, is from the first end 221. The first segment 211 comprises a secondary region 235, the whole secondary region 235 being arranged at least 25 mm apart from the first end 221 and the second end 222. This defines how "far" the secondary lamella blade 512, as discussed above, is from the first and second ends 221, 222. Reference is made to FIGS. 2a to 2c.

In line with what has been said above, the first segment 211 comprises primary lamella blades 511 that are transversal (i.e. not circumferential) and arranged within the primary region 231. The first segment 211 further comprises secondary lamella blades 512 that are transversal (i.e. not circumferential) and arranged within the secondary region 235.

As for the term "transversal" (i.e. not circumferential) within the context of this specification, a transversal lamella blade (511, 512) is such a lamella blade that a direction of a length L of the lamella blade 511, 512 does not form an angle of less than 30 degrees with a circumferential C direction of the first segment 511.

In contrast, in an embodiment where the first segment 211 comprises a circumferential ridge for forming a circumferential groove, the circumferential ridge extends primarily is such a direction that forms an angle of less than 30 degrees with the circumferential direction C. It is noted, that in such a case, the direction of extension of the circumferential ridge may form also an angle of more than 30 degrees with the circumferential direction C, because an intersection of two straight lines defines four angles, i.e. two pairs of equal angles, as well known.

As an example, FIGS. 5a to 8d, 10a to 10c, and 13a and 13b show lamella blades. Their lengths, L, are also shown in the figures. In general, a direction of the length L is perpendicular to a direction of the height $h_1$, $h_2$ of the lamella blade 511, 512, respectively. Moreover, in general, a direction of the length L is perpendicular to a direction of the thickness $t_1$, $t_2$ of the lamella blade 511, 512, respectively. As for the term "direction of a length", it is noted that a length is measured (or defined) in a certain direction. The direction of the length refers to the direction in which the length is measured or defined. This applies mutatis mutandis to the direction of the height $h_1$, $h_2$ and to the direction of the thickness $t_1$, $t_2$. As readable from the figures, a direction of thickness may depend on the position where the thickness is defined. Typically a "length" is greater than a thickness. The length of a sipe may be e.g. a distance between two ends of the sipe. Typically the height is defined (or measured) in the radial direction SR.

Referring to FIGS. 2a and 2b, the primary lamella blades 511 comprise a first primary lamella blade 521, and the secondary lamella blades 512 comprise a first secondary lamella blade 531. Thus, even if the first segment 211 comprises multiple primary lamella blades 511 arranged in the primary region 231, some structural details of one specific blade of those blades, i.e. the first primary lamella blade 521 will be detailed below. In a similar manner, even if the first segment 211 comprises multiple secondary lamella blades 512 arranged in the secondary region 235, some structural details of one specific blade of those blades, i.e. the first secondary lamella blade 531 will be detailed below. Naturally all the primary lamella blades 511 may have the features detailed below for the one specific blade, i.e. the first primary lamella blade 521.

To improve the properties of the tire 100 manufacturable by the mould 200, a height of primary lamella blades 511 arranged near the segments ends 221, 222 substantially equals a height of secondary lamella blades 512 arranged far away the segments ends 221, 222. In more specific terms, an average of the heights $h_1$ of the primary lamella blades 511 is at least 75% of an average of the heights $h_2$ of the secondary lamella blades 512. More specifically, an average of the heights $h_1$ of the primary lamella blades 511 is 75% to 125% of an average of the heights $h_2$ of the secondary lamella blades 512. More preferably, an average of the heights $h_1$ of the primary lamella blades 511 is 90% to 110% of an average of the heights $h_2$ of the secondary lamella blades 512. The heights are shown at least in FIGS. 5a, 5c, 6a, 7a, and 7c. It is noted that when a lamella blade does not have a constant height, the height refers to the maximum height of that lamella blade, as shown in FIGS. 5a, 5c, 6a, 7a, and 7c. The average height is calculated as usual; i.e. by calculating the sum of heights of the transversal lamella blades and dividing the sum by the number of transversal lamella blades (the average is calculated separately for the primary region 231 and for the secondary region 235).

To withstand the high bending stress, on the average, a bending strength of the primary lamella blades 511 against bending in a circumferential direction C of the mould 200 is greater than a bending strength of the secondary lamella blades 512 against bending in the circumferential direction C of the mould 200.

With respect to how a bending strength of the primary lamella blades 511 can be made greater than the bending strength of the secondary lamella blades 512, there are at least three options, which are combinable.

As a first option, to increase bending strength, the first primary lamella blade 521 may comprise a stiffening member 550 configured to strengthen the first primary lamella blade 521 against bending in the circumferential direction C of the mould 200.

Figure 5B:
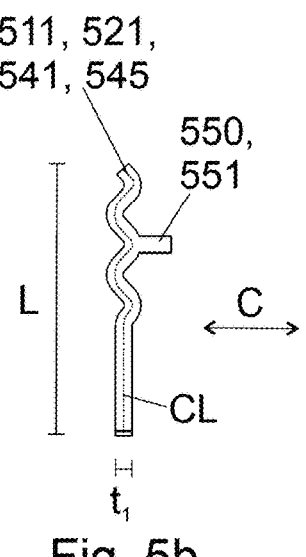
FIG. 5*b* shows the lamella blade of FIG. 5*a* in a radially inward cross sectional view.
Figure 5C:
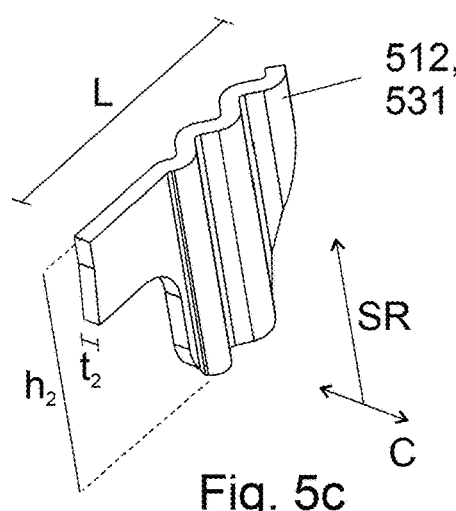
FIG. 5*c* shows a lamella blade of a segment of a mould, the lamella blade not having a stiffening member.
Figure 5D:
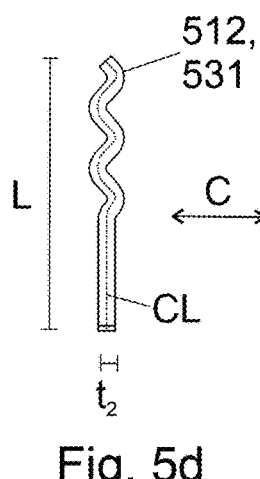
FIG. 5*d* shows the lamella blade of FIG. 5*c* in a radially inward cross sectional view.

A first example of a stiffening member 550, the stiffening member being a stiffening ridge 551, is shown in FIGS. 5a, 5b, 5e, 7a, 7b, 10a-10c, and 13a and 13b. The figures show a first primary lamella blade 521 comprising the stiffening ridge 551. In contrast, the first secondary lamella blade 531 of FIGS. 5c and 5d does not comprise the stiffening ridge 551. The stiffening ridge is a ridge that protrudes from a wall of the lamella blade. The stiffening ridge is a ridge, which may protrude, from wall of the lamella blade, to a direction that is substantially perpendicular to a direction of length of the lamella blade. The stiffening ridge may protrude from a wall of the lamella blade to a direction that forms an angle of 20 to 160 degrees with a direction of the length of the first primary lamella blade 512. The length of the first primary lamella blade 512 may be defined as a distance between two most distant end points of a projection of the first primary lamella blade 512, the projection being to a plane having a normal to the direction of height of the first primary lamella blade 512. Such a projection, and the length L, are shown in FIG. 5b.

Moreover, preferably the stiffening ridge 551 protrudes from the wall of the lamella blade to a direction that forms an angle of at most 30 degrees with the circumferential direction C. This has the effect that the stiffening ridge 551 supports the lamella blade particularly in the circumferential direction C. It is noted that the opening of the mould as discussed above generates forces to the lamella blades particularly in the circumferential direction; and particularly to transversal lamella blades. The term "transversal" has been defined above, and need not refer to exactly axial direction of the tire (or corresponding direction of the segment).

For example, the first primary lamella blade 521 shown in FIGS. 5a and 5b is arranged to produce such a transversal sipe that a direction of a length of the sipe forms a right angle with the circumferential direction (see FIG. 5b). Moreover, as shown in FIG. 5b, the stiffening ridge 551 protrudes from a wall of the lamella blade 521 to a direction that forms an angle of 90 degrees with a direction of the length L of the first primary lamella blade 512. Furthermore, in such a case, the stiffening ridge 551 protrudes from the wall of the lamella blade to a direction that forms an angle of zero degrees with the circumferential direction C (see FIG. 5b).

Figure 5E:
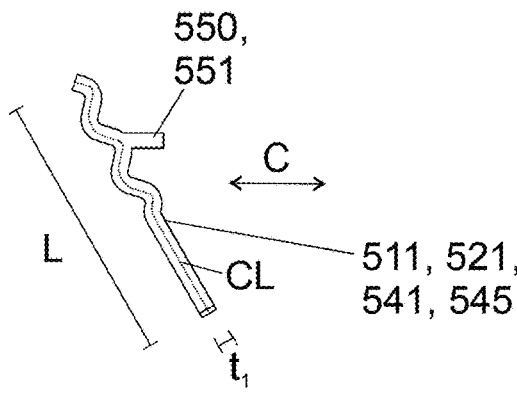
FIG. 5*e* shows a lamella blade in a radially inward cross sectional view, the lamella blade having a stiffening member.

As another example, the first primary lamella blade 521 shown in FIG. 5e is arranged to produce such a transversal sipe that a direction of a length L of the sipe forms an angle of 60 degrees angle with the circumferential direction C (see FIG. 5e). It is noted that in FIG. 5e, the direction of a length L of the sipe also forms an angle of 120 degrees angle with the circumferential direction C; neither the angle 60 nor 120 degrees being less than 30 degrees in accordance with the definition of "transversal" (see above). Moreover, as shown in FIG. 5e, the stiffening ridge 551 protrudes from a wall of the lamella blade 521 to a direction that forms angles of 60 degrees and 120 degrees with a direction of the length L of the first primary lamella blade 512. Furthermore, in FIG. 5e, the stiffening ridge 551 protrudes from the wall of the lamella blade to a direction that forms an angle of zero degrees with the circumferential direction C (see FIG. 5e).

Figure 7A:
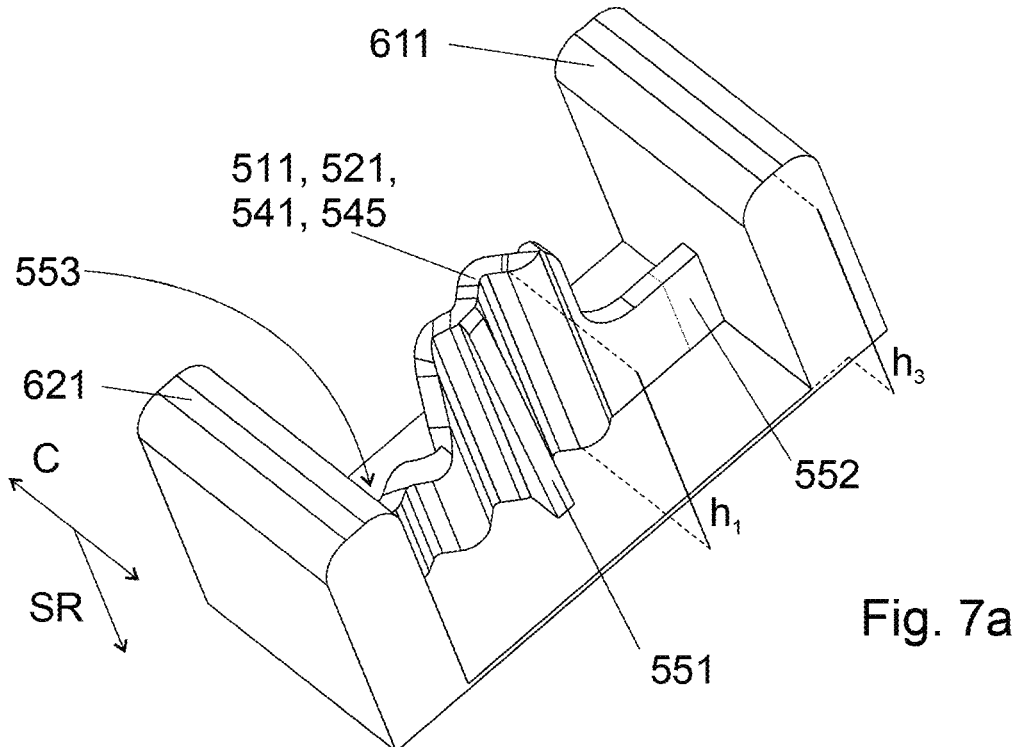
FIG. 7*a* shows a lamella blade of a segment of a mould in a perspective view, the lamella blade being joined to two ridges for forming a groove and having a stiffening ridge, thereby comprising three stiffening members.
Figure 13A:
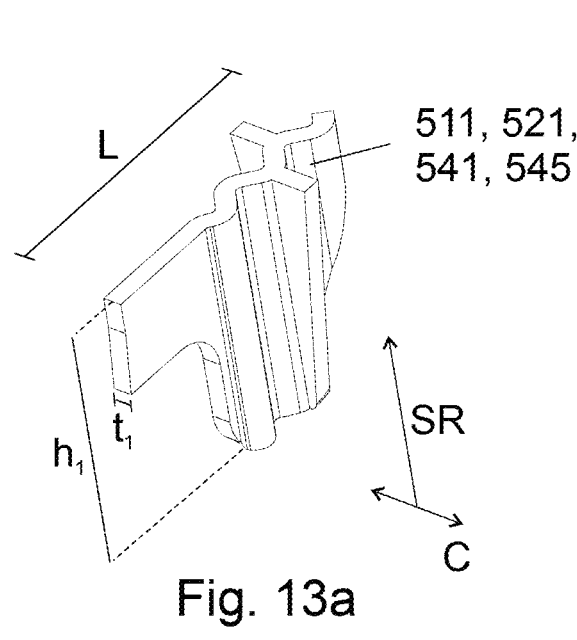
FIG. 13*a* shows a lamella blade of a segment of a mould in a perspective view, the lamella blade having two stiffening members in the form of a stiffening ridges, the stiffening ridges being arranged on opposite sides of the lamella blade.
Figure 13B:
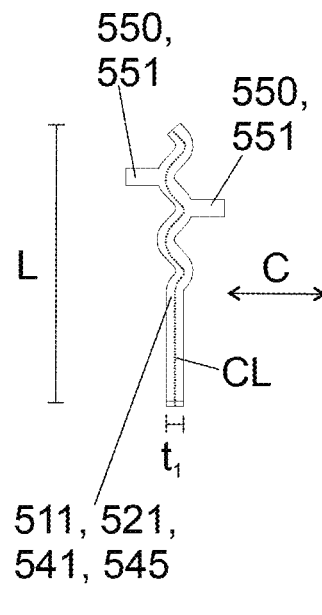
FIG. 13*b* shows the lamella blade of FIG. 13*a* in a radially inward cross sectional view.

A lamella blade 521 may comprise only one stiffening member 550 as readable from above. However, referring to FIGS. 13a and 13b, a lamella blade 521 may comprise two stiffening members 550, such as two stiffening ridges 551. The stiffening ridges may be arranged on opposite sides of the lamella blade 521 as shown in FIGS. 13a and 13b. In the alternative or in addition, two stiffening ridges 551 may be arranged on a same side of a lamella blade 521. A lamella blade 521 may comprise more than two stiffening members 550 (FIG. 7a). Even if not shown, a lamella blade 521 may comprise more than two stiffening ridges 551. Some or all of them may be arranged on one side of the lamella blade 521. Some of them may be arranged on opposite sides of the lamella blade 521.

Figure 10A:
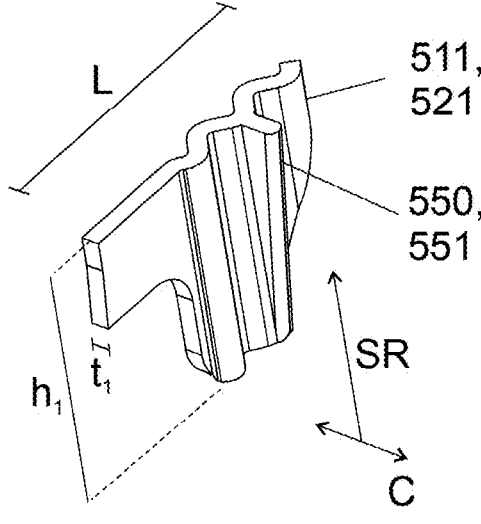
Figure 10B:
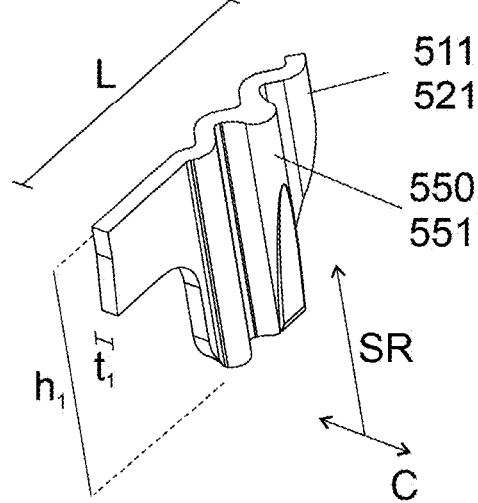
Figure 10C:
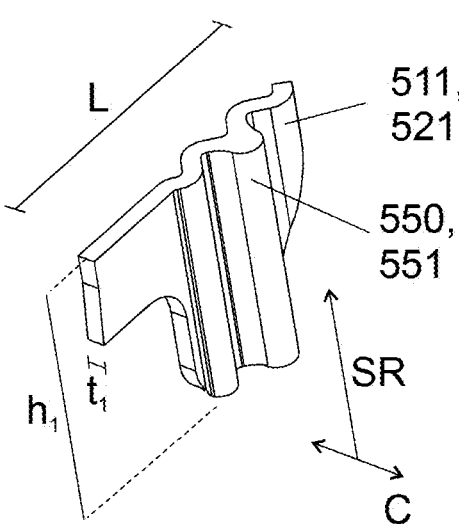

FIGS. 10a to 10c show further embodiments of a stiffening ridge 551. As shown in FIG. 10a, an end of the stiffening ridge 551 may be rounded. However, the end need not be rounded as shown in FIG. 5a. In both the FIGS. 5a and 10a the stiffening ridge becomes shorter in the inwards radial direction −SR (see the Figs). Moreover, in FIGS. 5a and 10a, the shortening takes place throughout the whole height $h_1$ of the primary lamella blade 511. However, as shown in FIG. 10c, the stiffening ridge 551 need not shorten at all. In contrast, a height (not shown) of the stiffening ridge 551 may be constant throughout the whole height $h_1$ of the primary lamella blade 511. Thus, the stiffening ridge 511 may be seen as a part of the primary lamella blade 511 that locally thickens the primary lamella blade. As detailed below as a second option, the thickness of the whole primary lamella blade can be increased, too. Moreover, as shown in FIG. 10b, the shortening of the stiffening ridge 511 in the inwards radial direction −SR may take place only on a part of the height of the primary lamella blade 511.

Figure 7B:
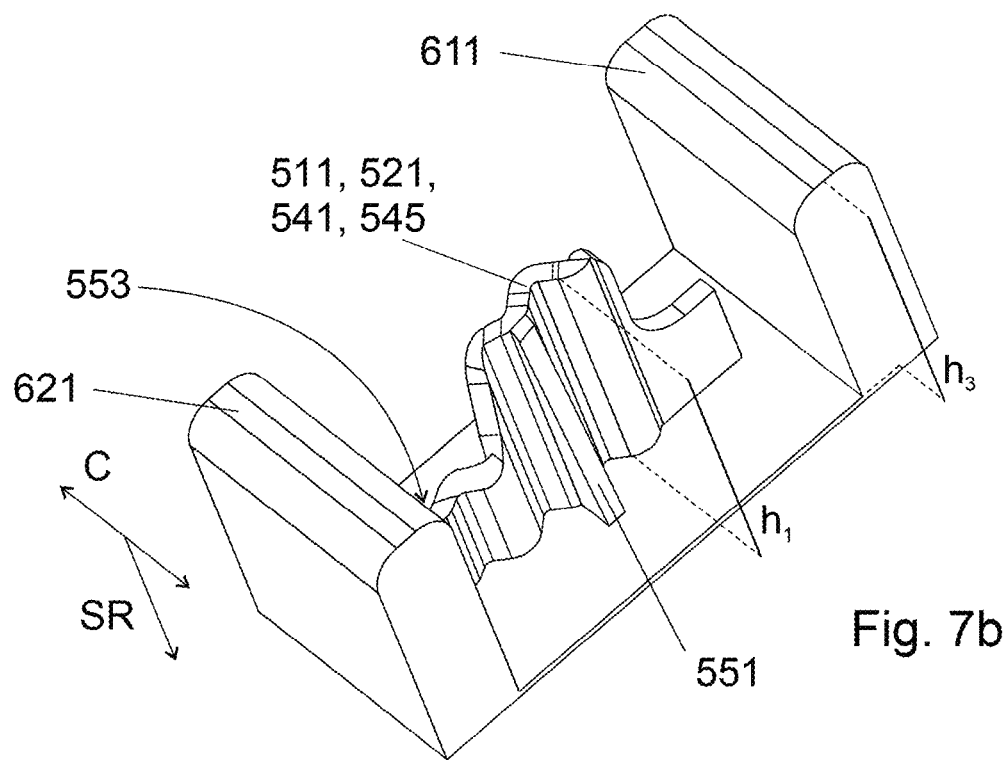
FIG. 7*b* shows a lamella blade of a segment of a mould in a perspective view, the lamella blade being joined to only one ridge for forming a groove and having a stiffening ridge.
Figure 7C:
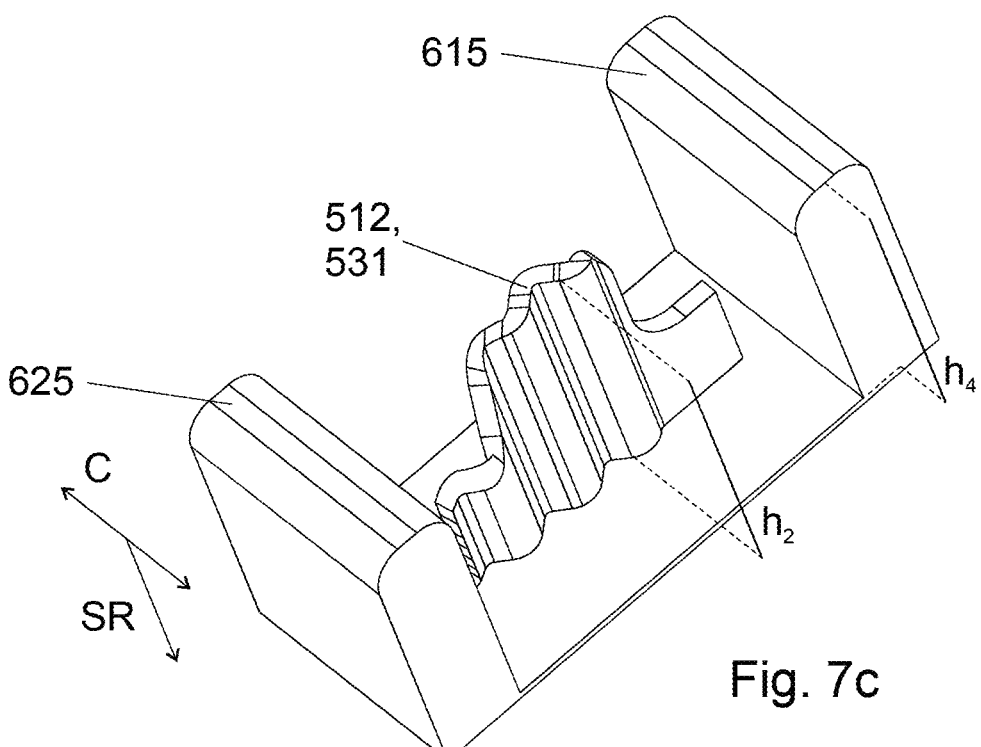
FIG. 7*c* shows a lamella blade of a segment of a mould in a perspective view, the lamella blade not having a stiffening ridge and not being joined to any ridge for forming a groove.

A second example of a stiffening member 550 is shown in FIGS. 7a to 7c. Therein the stiffening member 550 is a joint 552 (see FIG. 7a) that joins the first primary lamella blade 521 to a ridge 611, wherein the ridge 611 is configured to form a groove. Referring to FIG. 7c, the secondary lamella blades 512 need not comprise such a joint 552. Referring to FIG. 7b, the primary lamella blades 511 need not comprise such a joint 552, e.g. if the first primary lamella blade 521 comprises a stiffening ridge 551 (as in FIG. 7b), or comprises another joint that joins the first primary lamella blade 521 to a second ridge 621 for forming a groove. As detailed in FIG. 7a, the first primary lamella blade 521 may comprise a first joint 552 that joins the first primary lamella blade 521 to a first ridge 611 for forming a groove, a second joint 553 that joins the first primary lamella blade 521 to a second ridge 621 for forming a groove, and a stiffening ridge 551.

Figures 8A, 8B, 8C, 8D, 9A, 9B, 9C:
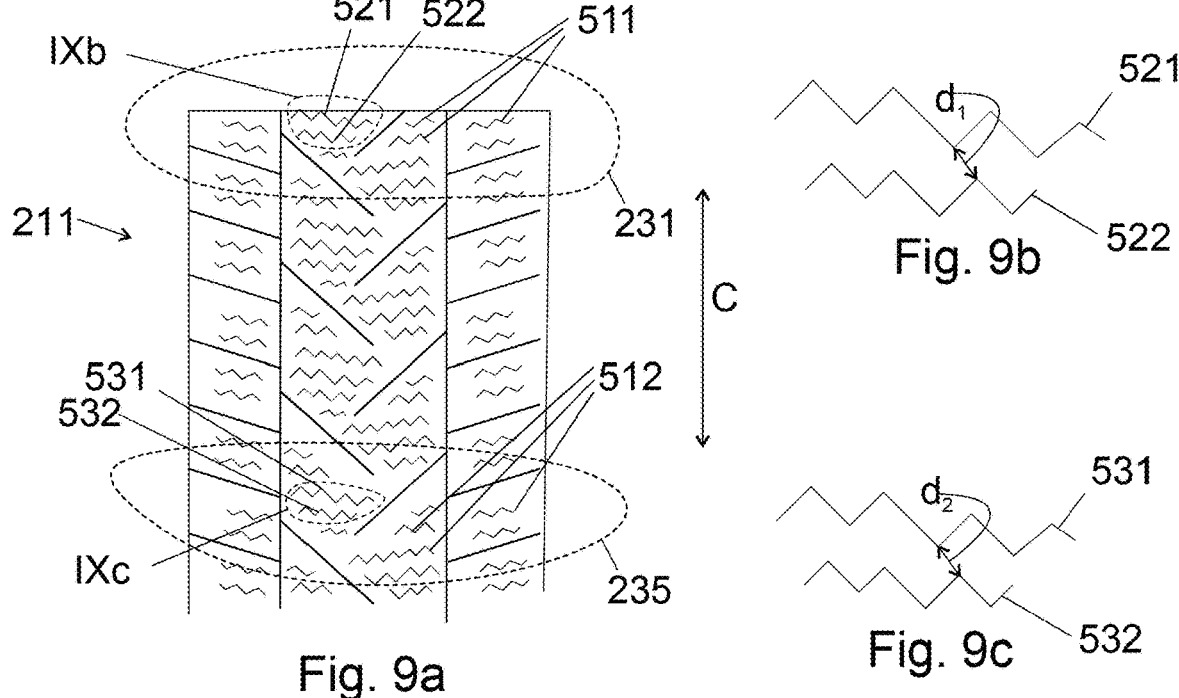
FIG. 8*a* shows a lamella blade of a segment of a mould in a perspective view, the lamella blade having a stiffening member in the form of a fold.
FIG. 8*b* shows the lamella blade of FIG. 8*a* in a radially inward cross sectional view.
FIG. 8*c* shows a lamella blade of a segment of a mould, the lamella blade not having a stiffening member.
FIG. 8*d* shows the lamella blade of FIG. 8*c* in a radially inward cross sectional view.
FIG. 9*a* shows a detail of the segment of the mould of FIG. 2*b*.
FIG. 9*b* shows the detail IXb of FIG. 9*a*.
FIG. 9*c* shows the detail IXc of FIG. 9*a*, FIG. 10*a*-*c* show lamellas blades for a segment of a mould in a perspective view, the lamella blades having a stiffening member in the form of a stiffening ridge.

A third example of a stiffening member 550 is shown in FIGS. 8a and 8b. Therein the stiffening member 550 is constructed as a fold 554. As well known, a lamella blade also normally comprises bends. However, the fold 554, which is intended for strengthening the lamella blade, changes the direction of extension of the projection of the lamella blade, as viewed in the direction of height of the lamella blade, more than a regular bend. Referring to FIG. 8b, a projection of the lamella blade to a plane having a normal to the direction of height of the first primary lamella blade 512 extends towards the fold 554 and to the fold 554 in a first direction dir1 and away from the fold 554 and from the fold 554 in a second direction dir2 such that an angle a between the first direction dir1 and the second direction dir2 is 60 to 120 degrees.

Preferable, the fold 554 is also arranged to such a location that no bend of the projection of the first primary lamella blade 512 to a plane having a normal to the direction of height of the first primary lamella blade 512 is arranged between the fold and one of the ends of the projection; as shown in FIGS. 8a and 8b. As an example, in FIG. 8b, there are two bends between the fold 554 and the upper end of the projection of the first primary lamella blade 521, but no bend between the fold 554 and the lower end of the projection of the first primary lamella blade 521. Thus, preferably, the first primary lamella blade 521 extends straight from the fold 554 to an end of the lamella blade, when viewed in the direction of the height of the first primary lamella blade 521.

For comparative purposes, FIGS. 8c and 8d show a secondary lamella blade 512 not comprising a fold, but only comprising bends. As readable from the figures, the primary lamella blade 511 of FIG. 8_a_ can be made by folding an end of a secondary lamella blade 512 of FIG. 8_c_ to form the fold 554.

As a second option to increase bending strength, a thickness $t_1$ of the first primary lamella blade 521 can be chosen to be greater than a thickness $t_2$ of the first secondary lamella blade 531. Thus, the first primary lamella blade 521 may be made from a thicker plate than the first secondary lamella blade 531. As an example, FIGS. 6_a_ and 6_b_ show a first primary lamella blade 521 of which thickness $t_1$ is greater than a thickness $t_2$ of the first secondary lamella blade 531 of FIGS. 5_c_ and 5_d_.

A thickness of the lamella blade 521 or the lamella blade 531 needs not be constant. If the thickness is not constant, the thickness, as discussed above, refers to a maximum thickness of the lamella blade. Thus, the lamella blades of FIGS. 10_b_ and 10_c_ may be seen as having a stiffening ridge 551, or in the alternative, as having a greater thickness at a location of the stiffening ridge 551 than the comparative blade of FIG. 5_c_. Other possibilities for increasing thickness is to gradually increase a thickness e.g. from one end to the other in the direction of the length L of the lamella blade.

As a third option, to increase bending strength, a strength of the material of the first primary lamella blade 521 may be selected to be greater than a strength of the material of the first secondary lamella blade 531. The first primary lamella blade 521 may be made from material having a higher ultimate tensile strength than the material of the first secondary lamella blade 531. The first primary lamella blade 521 may be made from more rigid material than the first secondary lamella blade 531. As an example, the first primary lamella blade 521 may be made by an additive manufacturing method, which typically results in stronger material (i.e. material with higher ultimate stress) than normally used for making lamella blades. In an embodiment, at least one of the primary lamella blades 511 has been manufactured by an additive manufacturing technology.

As an example, stainless steel, which is commonly used as material for a lamella blade, has a modulus of elasticity of about 190 GPa and an ultimate tensile strength of about 500 MPa. In contrast, an additively manufactured metal material, such as Ti-6Al-4V may have an ultimate strength of 1100 MPa. Some Cobalt-Chromium based metals manufactured by rapid prototyping also have an ultimate strength of over 900 MPa. Thus, in an embodiment, an ultimate tensile strength of the material of the first primary lamella blade 521 is at least 20% greater than an ultimate tensile strength of the material of the first secondary lamella blade 531. In an embodiment, an ultimate tensile strength of the material of the first primary lamella blade 521 is at least 50% greater than an ultimate tensile strength of the material of the first secondary lamella blade 531. Strength can be increased by other material selections, too.

As discussed above, the first segment 211 comprises the primary region 231, and primary lamella blades 511 that are transversal are arranged within the primary region 231. As shown in FIG. 9_a_, which shows in more detail a part of FIG. 2_b_, the primary lamella blades 511 include the first primary lamella blade 521 and a second primary lamella blade 522. In a similar manner, the first segment 211 comprises the secondary region 235, and secondary lamella blades 512 that are transversal are arranged within the secondary region 235. As shown in FIG. 9_a_, the secondary lamella blades 512 include the first secondary lamella blade 531 and a second secondary lamella blade 532.

To further improve the handling of the tire 100, the lamella blades are arranged to the first segment 211 such a distance between the lamella blades near the first segment end 221 is the same as further away from the first segment end 221 and away from the second segment end 222. Herein the distance refers to the distance between adjacent lamella blades as measured between their central lines CL, which central lines CL are perpendicular both to the height ($h_1$, $h_2$) and the thickness ($t_1$, $t_2$). The central line CL of each lamella blade remains at a centre between two walls of the lamella blade, wherein both of the two walls have a normal to direction of the thickness $t_1$, $t_2$ of that lamella blade. Examples of central lines CL have been shown in FIGS. 5_b_, 5_d_, and 5_e_. The distances $d_1$ and $d_2$ are shown in FIGS. 9_b_ and 9_c_.

Thus, in an embodiment, the primary lamella blades 511 comprise a second primary lamella blade 522 adjacent to the first primary lamella blade 521 and the secondary lamella blades 512 comprise a second secondary lamella blade 532 adjacent to the first secondary lamella blade 531. Moreover, a first distance $d_1$ (see FIG. 9_b_) between the central line CL of the first primary lamella blade 521 and the central line CL of the second primary lamella blade 522 is equal to a second distance $d_2$ (see FIG. 9_c_) between the central line CL of the first secondary lamella blade 531 and the central line CL of the second secondary lamella blade 532.

Hereinabove the term "adjacent" means that the second primary lamella blade 522, which is "adjacent" to the first primary lamella blade 521 is such a lamella blade that no other lamella blade (or ridge for a groove) is arranged between the second primary lamella blade 522 and the first primary lamella blade 521. Moreover, the second primary lamella blade 522 is adjacent in the circumferential direction C to the first primary lamella blade 521. Thus, at least one circumferential curve, which is parallel to the circumference, intersects both the second primary lamella blade 522 and the first primary lamella blade 521 in such a way that the circumferential curve does not intersect another lamella blade or a ridge for a groove between the second primary lamella blade 522 and the first primary lamella blade 521. These definitions apply mutatis mutandis to the second secondary lamella blade 532, which is adjacent to the first secondary lamella blade 531.

It is also noted that typically a tread pattern, i.e. the shape of the tread, is formed of pitches. Pitches are repeating parts of tread. A pitch may comprise e.g. only one such tread block that is part of an inner-side shoulder area of the tread. A pitch may comprise two such tread blocks that are part of an inner-side shoulder area of the tread. A pitch may comprise three such tread blocks that are part of an inner-side shoulder area of the tread. A pitch may comprise one, two, or three tread blocks that are part of an inner-side shoulder area of the tread and one, two, or three tread blocks that are part of an outer-side shoulder area of the tread. A tread may comprise e.g. 60 to 150 shoulder blocks on both inner and outer sides of the tread. More typically, a tread comprises e.g. 60 to 90 shoulder blocks on both inner and outer sides of the tread. Herein the terms inner and outer are used also for such tires that are not asymmetric tires. In use, one of the sides of the tread is implicitly an inner side and one side is the outer side even if the tire is a directional tire with a predefined direction of rotation R. A pitch may consist of an elementary portion or a pitch may comprise two or three elementary portions, an elementary portion comprising only one shoulder block per side or only one shoulder block on a side and extending towards the other side but not throughout the width of the tread. The elementary portions may be selected from one, two, three, four, five, or more than five different types of elementary portions. As an example, the elementary portions may be selected from a group of "large", "small", and "intermediate". As another example, the elementary portions may be selected from a group of "large", "large-intermediate", "intermediate", "small-intermediate", and "small".

Figure 4A:
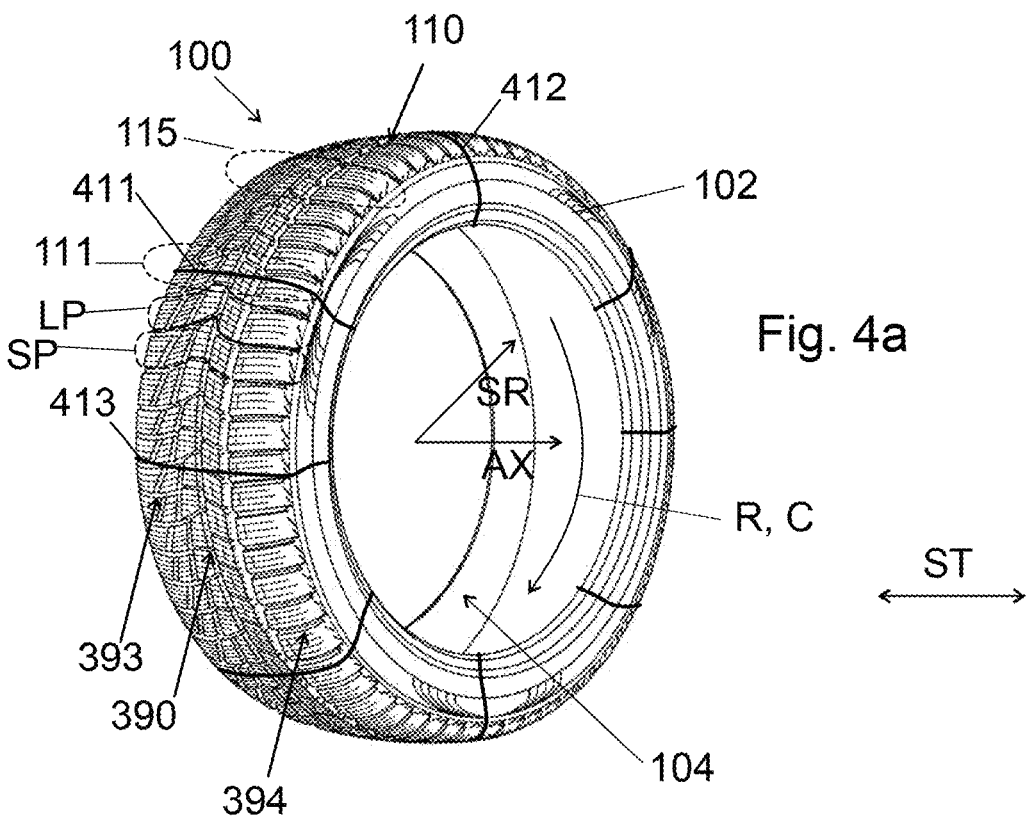
FIG. 4*a* shows a tire having a tread, the tire comprising a segment seam extending straight between sides of the tread.

To clarify, FIG. 4a shows a large elementary portion LP (with four sipes on a shoulder block on the right side) and a small elementary portion SP (with three sipes on a shoulder block on the right side); and a pitch (not shown) could be formed of the two elementary portions LP, SP; or a pitch could consist of either one of the elementary portions LP or SP; or a pitch could comprise both LP and SP and a further elementary portion.

A pitch need not comprise a shoulder block of both sides of the tread. Instead a pitch may extend from a side of the tread e.g. up to circumferential groove (or some other intermediate point between the sides of the tread), and another pitch may extend from that point to the other side of the tread.

In different types of elementary portions, the distance between adjacent sipes may be different. In a similar way, a distance between all adjacent lamella blades need not be equal.

Figure 3B:
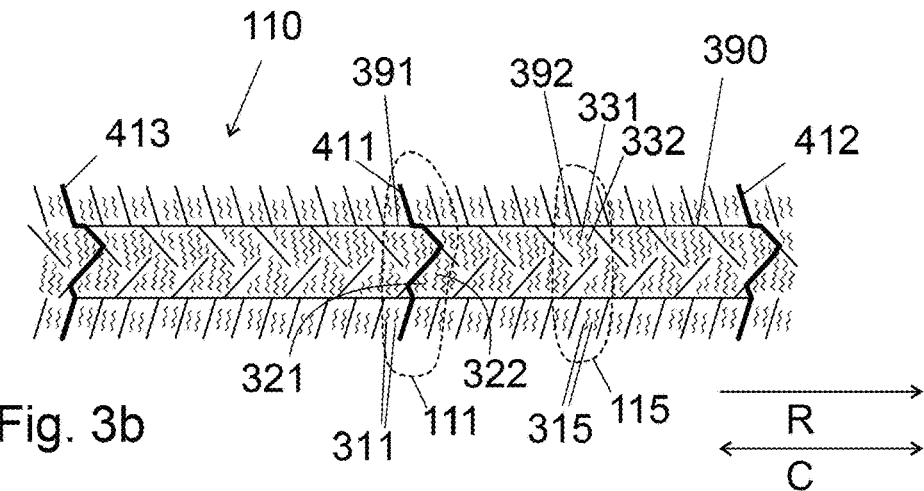
FIG. 3*b* shows in a radial inward projection a tread of a tire producible by a mould comprising the segment of FIG. 2*c*.

The lamella blades are used to form sipes to the tread 110 by pressing the lamella blades into the tread of the green tyre 105 and removing the lamella blades from the vulcanized tire 100 (see FIGS. 1a to 1d). Referring to FIGS. 3a to 4b, a tread 110 of a tire 100 typically comprises also a groove 390. The tread 110 may comprise a circumferential groove (or several circumferential grooves) and a transverse grooves. FIGS. 3a to 4b show a groove 390, which is circumferential. Referring to FIGS. 2a and 2b such a groove 390 (circumferential or transverse) is also formed by the mould 200. Therefore, referring to FIG. 2b, in an embodiment, the first segment 211 comprises a primary ridge 611 for forming a first part 391 of a groove 390 (circumferential or transverse). The primary ridge 611 is arranged in the primary region 231. FIGS. 3a and 3b show the first part 391 of the groove 390 manufacturable by the primary ridge 611. A more realistic figure of a primary ridge 611 is shown in FIGS. 7a to 7c. These figures show both a first primary ridge 611 and a second primary ridge 621.

In the embodiment, the first segment 211 further comprises a secondary ridge 615 for forming a second part 392, which second part 392 is a second part 392 of the groove 390 or a second part 392 of another groove. The secondary ridge 615 is arranged in the secondary region 235. FIGS. 3a and 3b show the second part 392 of the groove 390 manufacturable by the secondary ridge 615. A more realistic figure of a secondary ridge 615 is shown in FIGS. 7a to 7c. These figures show both a first secondary ridge 615 and a second secondary ridge 625.

To improve handling of the tire 100, an average depth of the first part 391 of the groove (e.g. circumferential groove 390 or transverse groove 392, 394, 395, 396) equals an average depth of the second part 392 of the groove or another groove (e.g. circumferential groove 390 or transverse groove 392, 394, 395, 396). Correspondingly, in the mould 200, an average height of the secondary ridge 615 equals an average height of the primary ridge 611. The height is defined in the radial direction SR. FIGS. 7a and 7b show the height $h_3$ of the primary ridge 611 and FIG. 7c shows the height $h_4$ of the secondary ridge 615.

Preferably this applies to at least a circumferential groove 390. Thus, in an embodiment, an average depth of the first part 391 of a circumferential groove 390 equals an average depth of the second part 392 of the groove 390. Correspondingly, in the mould 200, an average height of the secondary circumferential ridge 615 equals an average height of the primary circumferential ridge 611.

Moreover, to ensure that the sipes of the tire soften the material of the tire also for a substantial amount of wear, in an embodiment, an average of the heights $h_1$ of the primary lamella blades 511 is 45% to 95% of the average of the height h3 of the primary ridge 611 (see FIG. 7a). In an embodiment, the average of the heights $h_1$ of the primary lamella blades 511 is 65% to 90% of the average of the height h3 of the primary ridge 611 (see FIG. 7a). In an embodiment, the height $h_3$ of the primary ridge 611 is constant in the direction of the length of the primary ridge 611 (i.e. independent of location in the longitudinal direction). In an embodiment, the height of the secondary ridge 615 is constant in the direction of length of the secondary ridge 615 (i.e. independent of location in the longitudinal direction). Such an arrangement is facilitated by the fact that the primary lamella blades 511 are more or less as deep as the secondary lamella blades 512, as discussed in more detail above.

A gist of the present embodiments is that the primary lamella blades 511 have a higher bending strength than the secondary lamella blades 512. As detailed above, this may be achieved only by material selection for the primary lamella blades 511.

Figure 6A:
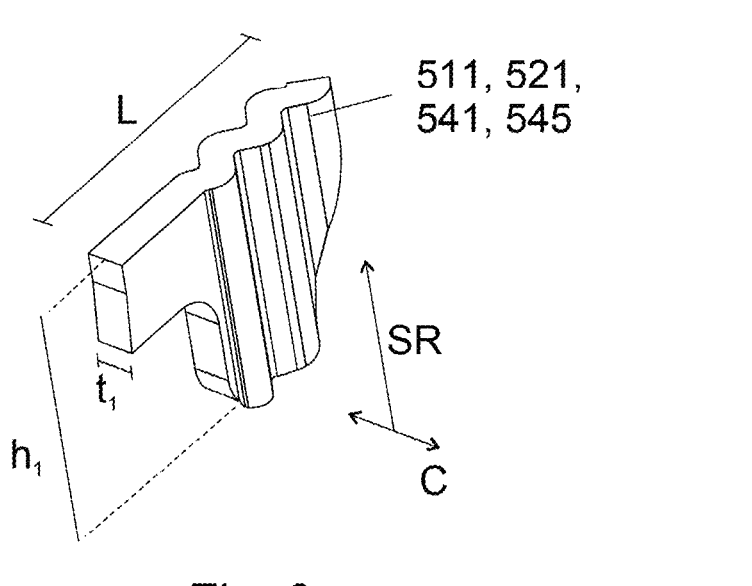
FIG. 6*a* shows a lamella blade of a segment of a mould in a perspective view, the lamella blade being thicker than the lamella blade of FIG. 5*c*.
Figure 6B:
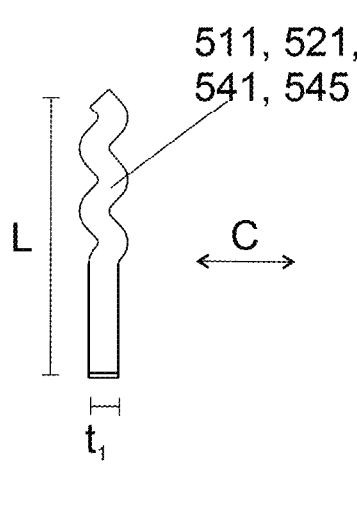
FIG. 6*b* shows the lamella blade of FIG. 6*a* in a radially inward cross sectional view.

However, in an embodiment, the first primary lamella blade 521 (i.e. one of the primary lamella blades 511)

comprises a one or more stiffening members 550 configured to strengthen the first primary lamella blade 521 against bending in the circumferential direction C of the mould, examples of stiffening members 550 including a stiffening ridge, a joint, and a fold, as discussed above, and/or is thicker than one of the secondary lamella blades 512, as shown in FIGS. 6a and 6b.

Moreover, in that embodiment, preferably none the secondary lamella blades 512 is identical in shape and thickness to the first primary lamella blade 521. A secondary lamella blade 512, e.g. that of FIGS. 5c and 5d may have the same thickness as the first primary lamella blade 521 of e.g. FIGS. 5a and 5b. However, the shape is different. A secondary lamella blade 512, e.g. that of FIGS. 5c and 5d may have a smaller thickness $t_2$ than the first primary lamella blade 521 $t_1$ of e.g. FIGS. 6a and 6b. However, the shape may be otherwise similar.

The mould 200 is used to manufacture a tire 100 as shown in FIGS. 1a to 1d. The lamella blades 511, 512 form sipes. The shape of the sipes thus correspond to the shape of the lamella blades. The shape may be considered as mirror-symmetric mainly because the tread 110 of the tire is viewed from different direction than the mould 200. For example, a tread 110 can only be seen, when viewed from outside, towards the centre, in the negative radial direction −SR. In contrast, the mould 200 or the first segment 211 thereof can be viewed from the centre O (see FIG. 1c) outwards, in the positive radial direction +SR. For these reasons, the tread pattern of FIGS. 3a and 3b are mirror images of the lamella blades and ridges for grooves of FIGS. 2b and 2c, respectively.

Thus, an embodiment of the invention is a tire 100, which is manufacturable by the mould 200 as detailed above.

Figure 4B:
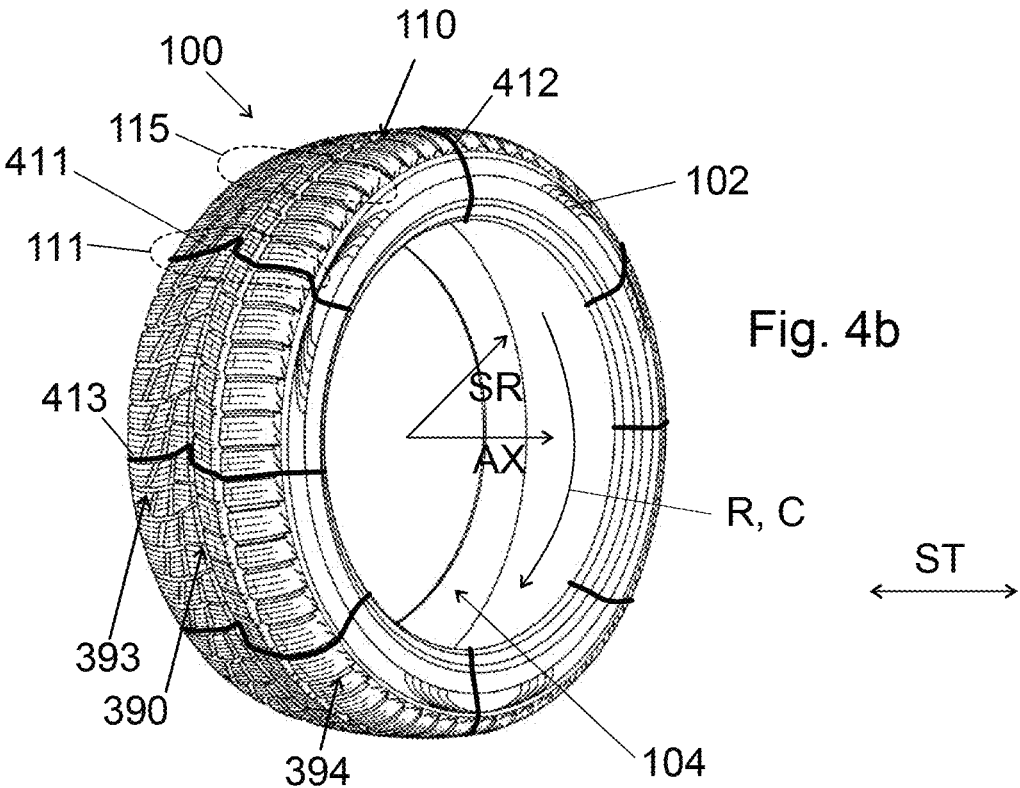
FIG. 4*b* shows a tire having a tread, the tire comprising a segment seam extending between sides of the tread along grooves of the tread.

In more specific terms and with reference to FIGS. 3a to 4b, an embodiment of the invention is a tire 100 that comprises a first side wall 102, a second side wall 104, and a tread 110. Because the tire 100 has been manufactured by the mould 200 as detailed above, the tire 100 comprises a first segment seam 411 extending between the first side wall 102 and the second side wall 104. As shown in FIGS. 3a and 4a, the first segment seam 411 may extend straight between the first side wall 102 and the second side wall 104. As shown in FIGS. 3b and 4b, the first segment seam 411 need not extend straight between the first side wall 102 and the second side wall 104. This applies to other segments seams 412, 413 as well.

As detailed above, the first segment 211 comprises a primary region 231 and a secondary region 235. Likewise, the tread 110 of the tire, which has been made by the mould 200, comprises a primary area 111 and a secondary area 115, of which at least a part of the primary area 111 corresponds to the primary region 231 and the secondary area 115 corresponds to the secondary region 235. Another part of the primary area 111 may be produced by an end of another segment as will be discussed in connection with FIGS. 11a to 12c.

The whole primary area 111 is arranged at most 20 mm apart from the first segment seam 411 and the whole secondary area 115 is arranged at least 25 mm apart from the first segment seam 411. In an embodiment, the primary area 111 comprises a part of the first segment seam 411. Moreover, the primary area 111 is provided with primary sipes 311, and the secondary area 115 is provided with secondary sipes 315. Referring to FIGS. 3a and 3b, in an embodiment, the primary sipes 311 comprise a first primary sipe 321 and a second primary sipe 322. Referring to FIGS. 3a and 3b, in an embodiment, the secondary sipes 315 comprise a first secondary sipe 331 and a second secondary sipe 332. As detailed in connection with the mould, the primary sipes 311 are not circumferential sipes (i.e. they are transversal sipes) and the secondary sipes 315 are cot circumferential sipes (i.e. they are transversal sipes). In line with what has been said for the lamella blades, a transversal sipe is such a sipe that a direction of a length of the sipe (311, 315) does not form an angle of less than 30 degrees with a circumferential C direction of the tread 110. In contrast, a circumferential groove (if present in the tire, e.g. the groove 390) extends primarily in such a direction that forms an angle of less than 30 degrees with the circumferential direction C. What has been said about the angles in connection with lamella blades applies mutatis mutandis to the sipes.

In the primary area 111 the primary sipes 311 are substantially as deep as the secondary sipes 315 of the secondary area 115. Thus, an average of the depths of the primary sipes 311 is at least 75% of an average of the depths of the secondary sipes 315. Preferably, an average of the depths of the primary sipes 311 is 75% to 125% of an average of the depths of the secondary sipes 315. More preferably, an average of the depths of the primary sipes 311 is 90% to 110% of an average of the depths of the secondary sipes 315. When a depth of a sipe is not constant, a depth of the sipe refers to its maximum depth. The average is calculated as usual. Reference is made to what has been said in connection with the first segment 211.

As detailed above, in an embodiment, (i) at least one of the primary sipes 311 has been produced by a lamella blade that comprises a stiffening member 550 strengthening the lamella blade in a circumferential direction of the tire 100 and/or (ii) a width of at least one of the primary sipes 311 is greater than a width of one of the secondary sipes 315. As a results of the manufacturing method, a width of a sipe equals to a thickness $t_1$, $t_2$ of the lamella blade used to form the sipe. In an embodiment, (iii) at least one of the primary sipes 311 has been produced by a lamella blade that comprises material having higher ultimate tensile strength than the material of the lamella blades used for producing the secondary sipes 315.

Concerning the first option (i), several different types of stiffening members 550 have been discussed in the context of the first segment 211. Presence of such a stiffening member 500, e.g. a stiffening ridge 551, a joint 552, 553, or a fold 554, is observable from the shape of at least one of the primary sipes 311. Concerning the second option (ii), even if a stiffening member was not used, the width of at least one of the primary sipes 311 being greater than a width of one of the secondary sipes 315 is indicative of the at least one of the primary sipes 311 having been produced by a thick lamella blade, which, as disclosed above, has a higher bending strength than a thinner lamella blade. Naturally, one or more of the primary sipes 311 may be both thick and have such a shape that the shape is indicative of the sipe having been produced by a lamella blade that comprises a stiffening member strengthening the lamella blade in a circumferential direction of the tire 100.

As detailed in the context of the first segment 211, preferably the distance $d_1$ between two adjacent primary lamella blades 511 (e.g. the blades 521, 522 in FIG. 9b equals the distance $d_2$ between two adjacent secondary lamella blades 512 (e.g. the blades 531, 532 in FIG. 9c. This applies to the tread 110 of the tire 100 as well.

Thus, in an embodiment, the primary sipes 311 comprise a first primary sipe 321 and a second primary sipe 322 adjacent to the first primary sipe 321 and the secondary sipes 315 comprise a first secondary sipe 331 and a second secondary sipe 332 adjacent to the first secondary sipe 331. Such sipes, which are also adjacent to each other, are shown e.g. in FIGS. 3a and 3b. Moreover, preferably, a distance between a central line of the first primary sipe 321 and a central line of the second primary sipe 322 is equal to a distance between a central line the first secondary sipe 331 and a central line of the second secondary sipe 332.

Hereinabove the term "adjacent" means that the second primary sipe 322, which is "adjacent" to the first primary sipe 321 is such a sipe that no other sipe (or groove) is arranged between the second primary sipe 322 and the first primary sipe 321. Moreover, the second primary sipe 322, is adjacent in the circumferential direction C to the first primary sipe 321. Thus, at least one circumferential curve, which is parallel to the circumference, intersects both the second primary sipe 322 and the first primary sipe 321 in such a way that the circumferential curve does not intersect another sipe or a groove between the second primary sipe 322 and the first primary sipe 321. These definitions apply mutatis mutandis to the second secondary sipe 332, which is adjacent to the first secondary sipe 331.

As detailed above, in an embodiment, the first segment 211 comprises a primary ridge 611 for forming a first part 391 of a groove 390, 393, 394, 395, 396 and a secondary circumferential ridge 615 for forming a second part 392, the second part 392 being a second part 392 of the groove (390, 393, 394, 395, 396) or a second part 392 of another groove (393, 394, 395, 396, 390). Thus, in an embodiment of the tire 100, the primary area 111 comprises a first part 391 of a groove 390, 393, 394, 395, 396 and the secondary area 115 comprises a second part 392 of the groove or another groove (see FIGS. 3a and 3b). Moreover, to have good properties, the depth of the groove 390 does not vary in the direction of length of the groove (i.e. longitudinal direction of the groove). Thus, an average depth of the first part 391 of the groove 390 equals an average depth of the second part 392 (of the groove or of the other groove). It is noted that a depth of the first part 391 of the groove corresponds to the height $h_3$ of the primary ridge 611 and a depth of the second part 392 groove corresponds to the height $h_4$ of the secondary ridge 615 (see FIGS. 7a to 7c).

The groove need not be circumferential. In the alternative, the groove may be transversal.

Moreover, to ensure that the sipe functions as intended also when the tire wears, in an embodiment, an average of the depths of the primary sipes 211 is 45% to 95% of the average depth of the first part 391 of the groove 390, 393, 394, 395, 396 (circumferential groove or transversal groove). A depth of a primary sipe 211 corresponds to the height $h_1$ of the primary lamella blade 511 by which the primary sipe 211 is manufactured. Preferably, an average of the depths of the primary sipes 211 is 65% to 90% of the average of the average depth of the first part 391 of the groove.

In general, a width of a sipe of the secondary region (i.e. a "normal") sipe may be in the range 0.3 mm to 1.2 mm. However, the width may depend on the type of the tire. In a tire for a passenger car, the width may be e.g. 0.3 mm to 0.8 mm, such as 0.4 mm to 0.6 mm. In a tire for a car other than a passenger car, e.g. light truck, the width may be e.g. 0.5 mm to 1.2 mm, such as 0.6 mm to 1.0 mm.

Thus, in an embodiment, a width of a secondary sipe 315 is 0.3 mm to 1.2 mm, such as 0.4 mm to 1.0 mm. Thus, in an embodiment, an average of the widths of the secondary sipes 315 is 0.3 mm to 1.2 mm, such as 0.4 mm to 1.0 mm.

In an embodiment, the tire 100 is configured to be used on a wheel of a passenger car and a width of a secondary sipe 315 is 0.3 mm to 0.8 mm, such as 0.4 mm to 0.6 mm. Thus, in an embodiment, the tire 100 is configured to be used on a wheel of a passenger car and an average of the widths of the secondary sipes 315 is 0.3 mm to 0.8 mm, such as 0.4 mm to 0.6 mm.

In an embodiment, the tire 100 is generally intended to be used in a wheel other than a passenger car wheel and a width of a secondary sipe 315 is 0.5 mm to 1.2 mm, such as 0.6 mm to 1.0 mm. Thus, in an embodiment, the tire 100 is configured to be used in a wheel other than a passenger car wheel, e.g. a wheel of a light truck, and an average of the widths of the secondary sipes 315 is 0.5 mm to 1.2 mm, such as 0.6 mm to 1.0 mm.

Correspondingly, a thickness $t_2$ of a secondary lamella blade 512 may be 0.3 mm to 1.2 mm, such as 0.3 mm to 0.8 mm, such as 0.4 mm to 0.6 mm; or such as 0.5 mm to 1.2 mm, such as 0.6 mm to 1.0 mm.

Moreover, a thickness $t_1$ of a primary lamella blade 511 may be 0.3 mm to 1.2 mm, such as 0.3 mm to 0.8 mm, such as 0.4 mm to 0.6 mm; or such as 0.5 mm to 1.2 mm, such as 0.6 mm to 1.0 mm.

However, in an embodiment, the primary lamella blades 511 by which the primary sipes 311 have been made are thicker. Therefore, in an embodiment, a width of the first primary sipe 321 is at least 5% greater, preferably at least 10% greater, than a width of the first secondary sipe 331. In an embodiment, an average of the widths of the primary sipes 311 is at least 5% greater, preferably at least 10% greater, than an average of the widths of the secondary sipes 315.

Thus, a thickness $t_1$ of a primary blade 511 may be at least 5% or at least 10% greater than a thickness $t_2$ of a secondary lamella blade 512. This applies also when the thickness $t_2$ of a secondary lamella blade 512 is within the limits disclosed above.

In an embodiment of the tire, the primary sipes 311 comprise a first primary sipe 321. The first primary sipe has been produced by a primary lamella blade 511, such as the first primary lamella blade 521 discussed above. Thus, in an embodiment, a shape of the first primary sipe 321 is indicative of the first primary sipe 321 having been manufactured by using a primary lamella blade 511 comprising a stiffening member 550 configured to strengthen the primary lamella blade 511 against bending in a circumferential direction C of the tire. Examples of stiffening members have been disclosed above.

In a preferable embodiment, the secondary sipes 315 have not been produced by using lamella blades comprising a stiffening member; or secondary sipes 315 have been produced by using lamella blades that are thinner than the lamella blades used to form the primary sipes 311. Thus, preferably, the primary sipes 311 comprise a first primary sipe 321 and none the secondary sipes 315 is identical in shape and width to the first primary sipe 321. Also in this case, a shape of the first primary sipe 321 is indicative of the first primary sipe 321 having been manufactured by using a primary lamella blade 511 comprising a stiffening member 550.

A first example of a stiffening member 550 is the stiffening ridge 551, detailed above in connection with the lamella blade. In an embodiment, the first primary sipe 321 is indicative of the first primary sipe 321 having been manufactured by using a primary lamella blade 511 comprising a stiffening ridge 551, and none of the secondary sipes 315 have a shape indicative of the secondary sipe 315 having been manufactured by using a lamella blade comprising a stiffening ridge. Thus, in an embodiment, a shape of the first primary sipe 321 is indicative of the first primary sipe 321 having been manufactured by using a primary lamella blade 511 comprising at least a stiffening ridge 551. Moreover, in an embodiment, none of the secondary sipes 315 has such a shape that would be indicative of a secondary sipe 315 having been manufactured by using a lamella blade comprising a stiffening ridge 551.

A second example of a stiffening member 550 is a joint 552, 553 joining the lamella blade to a ridge 611, 621 forming a groove (e.g. for forming a transversal groove or a circumferential groove). Correspondingly, in an embodiment, the first primary sipe 321 extends to a groove, preferably a circumferential groove, at one end. In an embodiment, the first primary sipe 321 extends from one groove, preferably a circumferential groove, to another groove. Thus, in an embodiment, a shape of the first primary sipe 321 is indicative of the first primary sipe 321 having been manufactured by using a primary lamella blade 511 comprising (i) a joint 552 connecting the primary lamella blade 511 to a ridge 611, 621 for forming a groove (e.g. circumferential groove) or (ii) a first joint 552 connecting the primary lamella blade 511 to a first ridge 611 for forming a groove (e.g. circumferential groove) and a second joint 552 connecting the primary lamella blade 511 to a second ridge 621 for forming a groove.

A third example of a stiffening member 550 is a fold 554. Correspondingly, in an embodiment, when viewed from top, the first primary sipe 321 extends to a fold 554 in a first direction dir1 and from the fold 554 in a second direction dir2 such that an angle between the first direction dir1 and the second direction dir2 is 60 to 120 degrees. Preferably, the when viewed from top, the first primary sipe 321 extends straight from the fold 554 to an end of the primary sipe 321, which may be a groove.

As detailed above in connection with the mould 200, the mould 200 comprises multiple segments. Thus, an embodiment of the tire 100 comprises multiple segment seams 411, 412, 413. As discussed above, in the tire 100, the whole secondary area 115 is arranged at least 25 mm apart from the first segment seam 411. However, the secondary area 115 may refer to such an area that has been produced by the secondary region 235 of the first segment 211 of the mould. In such a case, the secondary area 115 of the tire refers to such an area that is far away from all the segments seams of the tire. Moreover, preferably, the lamella blades near the ends of other segments (212, 213, 214, 215, 216, 217, 218) are made stronger in a manner similar to how the primary lamella blades 511 near the ends 221, 222 of the first segment 211 are made stronger. Also for this reason, preferably, the secondary area 115 is not near any other segment seam 412, 413 either.

Thus, in an embodiment, the tire 100 comprises a second segment seam 412 extending between the first sidewall 102 and the second side wall 104 and the whole secondary area 115 is arranged at least 25 mm apart both from the first segment seam 411 and from the second segment seam 412. In an embodiment, the tire comprises multiple segment seams (411, 412, 413), such as at least six segment seams, each extending between the first side wall 102 and the second side wall 104, and the whole secondary area 115 is arranged at least 25 mm apart from all the segment seams (411, 412, 413) of the tire 100.

It is also noted that a tire designer needs to take into account various aspects in addition to handling and handling of worn tire. These aspects include grip, noise, vibrations, harshness, and stability, as detailed above. In the design process, the tire designer has some options for designing the tire tread 110. However, when applying these principles, it may happen that the tire tread 110 needs to comprise at least a sipe that extends on both sides of the first segment seam 411. Such an example is shown in FIG. 11a. As shown in FIG. 11a, the primary sipes 311 comprise a first primary sipe 321. As detailed above, the primary sipes 311 are arranged within the primary area 111. The first primary sipe 321 extends on both sides of the first segment seam 411 and across the first segment seam 411.

FIG. 11b shows the first primary sipe 321 of FIG. 11a in more detail. As shown therein, the tread 110 comprises the first segment seam 411 and the first primary sipe 321, wherein a first part 321a of the first primary sipe 321 is arranged on a first side S1 of the first segment seam 411 and a second part 321b of the first primary sipe 321 is arranged on a second side S2 of the first segment seam 411. The first primary sipe 321 extends across only the first segment seam 411. In other words, along a shortest path of the circumference of the tire 100, in between the first side S1 of the first segment seam 411 and the second side S2 of the first segment seam 411 is arranged only the first segment seam 411 and no other segment seam.

Because the parts 321a, 321b of the first primary sipe 321 are produced by lamella blades near ends of two different mould segments, what has been said above about primary sipes 311 applies to each one of the parts 321a and 321b.

Therefore, in this case the first part 321a of the first primary sipe 321 has been produced by a lamella blade that comprises a stiffening member strengthening the lamella blade in a circumferential direction of the tire 100 and the second part 321b of the first primary sipe 321 has been produced by a lamella blade that comprises a stiffening member strengthening the lamella blade in a circumferential direction of the tire 100, or a width of the first part 321a of the first primary sipe 321 is greater than a width of one of the secondary sipes 315 and a width of the second part 321b of the first primary sipe 321 is greater than a width of one of the secondary sipes 315, or the first part 321a of the first primary sipe 321 has been produced by a lamella blade that comprises a stiffening member strengthening the lamella blade in a circumferential direction of the tire 100 and a width of the second part 321b of the first primary sipe 321 is greater than a width of one of the secondary sipes 315.

These alternatives are not exclusive. Primary sipes 311 (in particular the parts 321a, 321b) may have a greater width than the secondary sipes 315 and also a shape indicative of being produced by a lamella blade having a stiffening member.

The first part 321a of the first primary sipe 321 may be made by using a primary lamella blade 511 as discussed above (however, a shorter one to make only a part of the sipe). The second part 321b of the first primary sipe 321 may be made by using a lamella blade that is similar to a primary lamella blade 511 as discussed above (however, a shorter one to make only a part of the sipe).

In particular, the first part 321a of the first primary sipe 321 may be made by using a first primary lamella blade 521 of a first segment 211 and the second part 321b of the first primary sipe 321 may be made by using a primary tertiary lamella blade 545 of a second segment 212; such segments being discussed below.

Such a tire 100 can be made by a mould 200 comprising an arrangement of (at least) two mould segments: the first mould segment 211 as discussed above and a second mould segment 212, as shown in FIG. 12a. In FIG. 12a, the mould is in an open position. As discussed above and shown in FIG. 12a, the first segment 211 comprises the first end 221 and the opposite second end 222. The first segment 211 comprises the primary region 231, the whole primary region 231 being arranged close to the first end 221 as discussed above. The first segment 211 comprises the secondary region 235, which is arranged far from the first end 221 and the second end 222 in line with what has been discussed.

Referring to FIG. 12a, the second segment 212 (i.e. the second mould segment 212) comprises a first end 223 of the second segment 212 and a second end 224 of the second segment 212. The reference numerals in FIG. 12a have been drawn so that a first end of a segment faces a first end of an adjacent segment. Thus, when an even number of segments is used, a second end of a segment faces a second end of an adjacent segment (not shown). FIG. 12b shows the detail XIIb of the arrangement of FIG. 12a in more detail.

The second segment 212 comprises a tertiary region 241, the whole tertiary region 241 being arranged close to the first end first end 223 of the second segment 212 as discussed above for the primary region 231 of the first segment 211 mutatis mutandis. It is noted that the second segment 212 comprises a quaternary region 245, which is arranged far from the first end 223 of the second segment 212 and the second end 224 of the second segment 212 in line with what has been discussed for the secondary region 235 of the first segment 211 mutatis mutandis.

The first segment 211 comprises primary lamella blades 511 that are transversal and arranged within the primary region 231. The primary lamella blades 511 comprise the first primary lamella blade 521 as detailed above.

The second segment 212 comprises tertiary lamella blades 541 that are transversal and arranged within the tertiary region 241. The tertiary lamella blades 541 comprise a first tertiary lamella blade 545. What has been said above for the first primary lamella blade 521 of the first segment 211 applies to the first tertiary lamella blade 545 of the second segment 212.

Figure 12C:
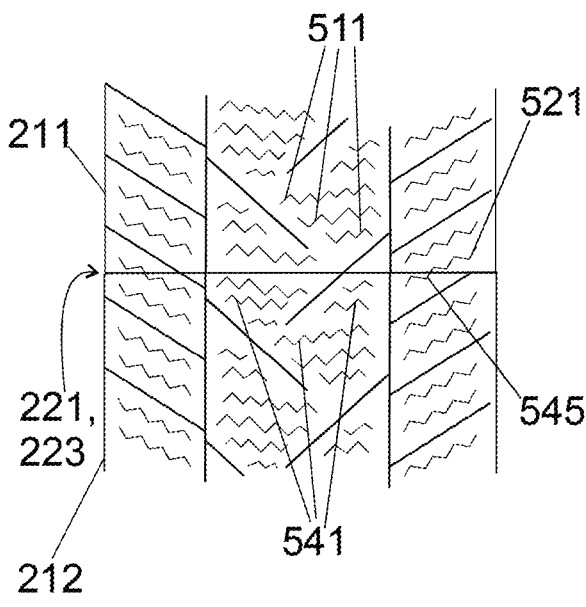
FIG. 12*c* shows the parts of FIG. 12*b*, when the mould is in the closed position.

Moreover, as shown in FIG. 12c, the first and second segments 211, 212 are configured such that when the mould 200 is in the closed position, the first end 221 of the first segment 211 contacts the first end 223 of the second segment 212. Moreover, the first tertiary lamella blade 545 is configured to form the second part 321b of the first primary sipe 321 and the first primary lamella blade 521 is configured to form the first part 321a of the first primary sipe 321, wherein the first primary sipe 321 extends from the first part 321a to the second part 321b continuously.

In an embodiment corresponding to the first option (see above) the first primary lamella blade 521 comprises a stiffening member 550 and the first tertiary lamella blade 545 comprises a stiffening member 550. Different embodiments of stiffening members 550 have been discussed above and shown e.g. in FIGS. 5a, 5b, 7a, 7b, 8a, and 8b.

In an embodiment corresponding to the second option (see above) a thickness $t_1$ of the first primary lamella blade 521 is greater than a thickness $t_2$ of the first secondary lamella blade 531 and a thickness of the first tertiary lamella blade 545 is equal to the thickness $t_1$ of the first primary lamella blade 521.

In an embodiment corresponding to the third option (see above) an ultimate tensile strength of the material of the first primary lamella blade 521 is greater than an ultimate tensile strength of the material of the first secondary lamella blade 531 and an ultimate tensile strength of the material of the first tertiary lamella blade 545 equals the ultimate tensile strength of the material of the first primary lamella blade 521.

It is also possible to strengthen the first primary lamella blade 521 by a stiffening member and to strengthen the first tertiary lamella blade 545 by increasing its thickness and/or using stronger material. Likewise, it is possible to strengthen the first primary lamella blade 521 by increasing its thickness and to strengthen the first tertiary lamella blade 545 by using a stiffening member and/or using stronger material. Likewise, it is possible to strengthen the first primary lamella blade 521 by using stronger material and to strengthen the first tertiary lamella blade 545 by using a stiffening member and/or by increasing thickness.

As detailed above, sipes are especially effective in improving grip. Therefore, in an embodiment, the mould comprises a first marking configured to press, to the tire 100, a second marking, the second marking being indicative of the tire 100 being suitable for use as a winter tire. Such a second marking may be e.g. "M+S" indicating that the tire is suitable for use on mud and snow. In an embodiment, the tire 100 comprises the second marking indicative of the tire 100 being suitable for use as a winter tire.

In addition or alternatively, a winter tire may comprise studs for improving grip. Thus, in an embodiment, the tread 110 of the tire 100 is equipped with studs for improving grip. In an embodiment, at least one of the segments on the mould comprises rods for making blind holes to the tread of the tire, which blind holes are configured to receive studs for improving grip of the tire.

The invention claimed is:

1. A mould for manufacturing a tire, the mould comprising:

a plurality of segments including a first segment, the plurality of segments configured to be in a first position and a second position, wherein in the first position, the segments are arranged next to each other to form an annular mould for a green tire, and wherein in the second position, the segments are arranged apart from each other to remove the tire from the mould, the first segment comprising:

a first end and an opposite second end, a primary region, the whole primary region being arranged at most 20 mm apart from the first end, a secondary region, the whole secondary region being arranged at least 25 mm apart from the first end and the second end, primary lamella blades are arranged within the primary region and are non-circumferential, and secondary lamella blades that are arranged within the secondary region and are non-circumferential, wherein:

the primary lamella blades comprise a first primary lamella blade and a second primary lamella blade adjacent to the first primary lamella blade, the secondary lamella blades comprise a first secondary lamella blade and a second secondary lamella blade adjacent to the first secondary lamella blade, a distance between a central line of the first primary lamella blade and a central line of the second primary lamella blade is equal to a distance between a central line of the first secondary lamella blade and a central line of the second secondary lamella blade, the central line of each lamella blade remains at a center between two walls of the lamella blade, an average of heights of the primary lamella blades is 75% to 110% of an average of heights of the secondary lamella blades, and a bending strength of the primary lamella blades against bending in a circumferential direction of the mould is greater than a bending strength of the secondary lamella blades against bending in the circumferential direction of the mould.

2. The mould of claim 1, wherein:

the first primary lamella blade comprises a stiffening member configured to strengthen the first primary lamella blade against bending in the circumferential direction of the mould; or a thickness of the first primary lamella blade is greater than a thickness of the first secondary lamella blade; or an ultimate tensile strength of a material of the first primary lamella blade is greater than an ultimate tensile strength of a material of the first secondary lamella blade.

3. The mould of claim 1, comprising a primary ridge for forming a first part of a groove, the primary ridge arranged in the primary region, and the average of the heights of the primary lamella blades is from 45% to 95% of an average of a height of the primary ridge.

4. The mould of claim 1, wherein:

the first primary lamella blade is thicker than one of the secondary lamella blades or comprises a stiffening member configured to strengthen the first primary lamella blade against bending in the circumferential direction of the mould, and none of the secondary lamella blades are identical in shape and thickness to the first primary lamella blade.

5. The mould of claim 1, wherein:

the first primary lamella blade comprises a stiffening member configured to strengthen the first primary lamella blade against bending in the circumferential direction of the mould.

6. The mould of claim 5, wherein the stiffening member comprises at least one of the following:

a joint connecting the first primary lamella blade to a ridge for forming a groove, a joint connecting the first primary lamella blade to a circumferential ridge for forming a circumferential groove, a first joint connecting the first primary lamella blade to a first ridge for forming a first groove and a second joint connecting the first primary lamella blade to a second ridge for forming a second groove, a fold, wherein the first primary lamella blade extends to the fold in a first direction and from the fold in a second direction such that an angle between the first direction and the second direction is 60 to 120 degrees, and the first primary lamella blade extends straight between the fold and an end of the first primary lamella blade, and a stiffening ridge that protrudes from a wall of the first primary lamella blade to strengthen the first primary lamella blade.

7. The mould of claim 1, wherein at least one of the primary lamella blades comprises an additive manufactured lamella blade.

8. A tire manufacturable by the mould of claim 1, comprising:

a first side wall;

a second side wall;

a tread comprising a primary area and a secondary area; and a first segment seam extending between the first and second side walls;

wherein:

the whole primary area is arranged at most 20 mm apart from the first segment seam, the whole secondary area is arranged at least 25 mm apart from the first segment seam, the primary area comprises primary sipes that are non-circumferential, the primary sipes comprise a first primary sipe and a second primary sipe adjacent to the first primary sipe, the secondary area comprises secondary sipes that are non-circumferential, the secondary sipes comprise a first secondary sipe and a second secondary sipe adjacent to the first secondary sipe, a distance between a central line of the first primary sipe and a central line of the second primary sipe is equal to a distance between a central line of the first secondary sipe and a central line of the second secondary sipe, the central line of each sipe remains at a center between two walls of the sipe, an average of depths of the primary sipes is 75% to 110% of an average of depths of the secondary sipes, and at least one of the primary sipes comprises a lamella blade shaped primary sipe, wherein the lamella blade comprises a stiffening member strengthening the lamella blade in a circumferential direction of the tire and/or a width of at least one of the primary sipes is greater than a width of one of the secondary sipes.

9. The tire of claim 8, wherein:

the primary area comprises a first part of a groove; and an average of the depths of the primary sipes is 45% to 95% of an average depth of the first part of the groove.

10. The tire of claim 8, wherein:

the primary sipes comprise a first primary sipe;

the secondary sipes comprise a first secondary sipe; and a width of the first primary sipe is at least 5% greater than a width of the first secondary sipe.

11. The tire of claim 8, wherein:

the primary sipes comprise a first primary sipe; and a shape of the first primary sipe corresponds to a primary lamella blade comprising a stiffening member configured to strengthen the primary lamella blade against bending in a circumferential direction of the tire.

12. The tire of claim 11, wherein the shape of the first primary sipe corresponding to the primary lamella blade comprising a stiffening member comprising at least one of the following:

a joint connecting the primary lamella blade to a ridge for forming a groove, a joint connecting the primary lamella blade to a circumferential ridge for forming a circumferential groove, a first joint connecting the primary lamella blade to a first ridge for forming a first groove and a second joint connecting the primary lamella blade to a second ridge for forming a second groove, a fold, wherein the primary lamella blade extends to the fold in a first direction and from the fold in a second direction such that an angle between the first direction and the second direction is 60 to 120 degrees, a fold, wherein the primary lamella blade extends to the fold in a first direction and from the fold in a second direction such that an angle between the first direction and the second direction is 60 to 120 degrees, and the primary lamella blade extends straight between the fold and an end of the primary lamella blade, and a stiffening ridge that protrudes from a wall of the first primary lamella blade to strengthen the first primary lamella blade.

13. The tire of claim 8, wherein:

the primary sipes comprise a first primary sipe; and none of the secondary sipes are identical in shape and width to the first primary sipe.

14. The tire of claim 8, comprising:

a second segment seam extending between the first side wall and the second side wall, wherein:

the whole secondary area is arranged at least 25 mm apart from the second segment seam.

15. A tire manufacturable by the mould of claim 1.

* * * * *